United States Patent
Shoemaker et al.

(10) Patent No.: US 8,474,222 B2
(45) Date of Patent: Jul. 2, 2013

(54) SYSTEM FOR HANDLING AND WRAPPING LARGE BALES

(75) Inventors: John Shoemaker, Ebensburg, PA (US); David T. Shoemaker, Ebensburg, PA (US)

(73) Assignee: wRapidRover, LLC, Ebensburg, PA (US)

( * ) Notice: Subject to any disclaimer, the term of this patent is extended or adjusted under 35 U.S.C. 154(b) by 387 days.

(21) Appl. No.: 12/835,771

(22) Filed: Jul. 14, 2010

(65) Prior Publication Data

US 2011/0014022 A1   Jan. 20, 2011

Related U.S. Application Data

(60) Provisional application No. 61/225,806, filed on Jul. 15, 2009.

(51) Int. Cl.
*B65B 11/00* (2006.01)
*A01D 90/08* (2006.01)

(52) U.S. Cl.
USPC ........... 53/167; 53/556; 53/588; 53/210; 414/24.5; 414/111

(58) Field of Classification Search
CPC .................. B65B 11/008; A01D 90/083
USPC ............ 53/531, 556, 567, 576, 588, 167, 53/203, 210; 414/24.5, 111
See application file for complete search history.

(56) References Cited

U.S. PATENT DOCUMENTS

| | | | |
|---|---|---|---|
| 3,341,039 A * | 9/1967 | Cranage | 414/111 |
| 3,966,063 A * | 6/1976 | Campbell et al. | 414/528 |
| 4,019,644 A | 4/1977 | Seymour | 414/481 |
| 4,082,157 A * | 4/1978 | Sternberg | 180/14.3 |
| 4,261,676 A * | 4/1981 | Balling, Sr. | 414/24.5 |
| 4,329,102 A | 5/1982 | Gray | 414/24.5 |
| 4,793,124 A | 12/1988 | Anderson | 53/588 |
| 5,012,631 A * | 5/1991 | Hostetler et al. | 53/588 |
| 5,071,304 A | 12/1991 | Godfrey | 414/111 |
| 5,596,864 A * | 1/1997 | Reeves | 53/556 |
| 5,660,023 A * | 8/1997 | Kivela | 53/588 |
| 5,661,956 A * | 9/1997 | Tardif | 53/588 |
| 5,700,124 A | 12/1997 | Dufraise | 414/111 |
| 5,829,233 A * | 11/1998 | Stirling | 53/567 |
| 6,070,400 A * | 6/2000 | Peeters et al. | 53/588 |

(Continued)

FOREIGN PATENT DOCUMENTS

WO    WO 9307059 A1 *    4/1993

*Primary Examiner* — Stephen F Gerrity
(74) *Attorney, Agent, or Firm* — Miller Law Group, PLLC

(57) ABSTRACT

A large bale transporter and an accompanying bale wrapper create a system for wrapping plastic around large bales retrieved by the transporter. The transporter has a loading apparatus that deposits large bales onto the load bed of the transporter until filled. The transporter is then manipulated to connect to a bale wrapper physically and operatively so that the bales can be moved into the wrapping apparatus. The frame of the transporter is pivotally connected to the axle to allow the rear end of the frame to be lowered to the ground to engage the bale wrapper and/or retrieve previously wrapped bales. The wrapping apparatus is powered by the drive mechanism of the transporter and is automatically disengaged when a pusher member placed at the end of the bales being discharged engages the drive coupler. An endless chain drive is drivable in opposite directions to move the bales on the transporter.

25 Claims, 31 Drawing Sheets

U.S. PATENT DOCUMENTS

| | | | |
|---|---|---|---|
| 6,082,076 A * | 7/2000 | Anderson et al. | 53/210 |
| 6,089,003 A * | 7/2000 | Frey | 414/24.5 |
| 7,404,479 B1 * | 7/2008 | Shoemaker et al. | 198/465.1 |
| 2007/0031229 A1 * | 2/2007 | Murfitt | 414/555 |
| 2011/0014014 A1 * | 1/2011 | Shoemaker | 414/24.5 |

* cited by examiner

Fig. 3
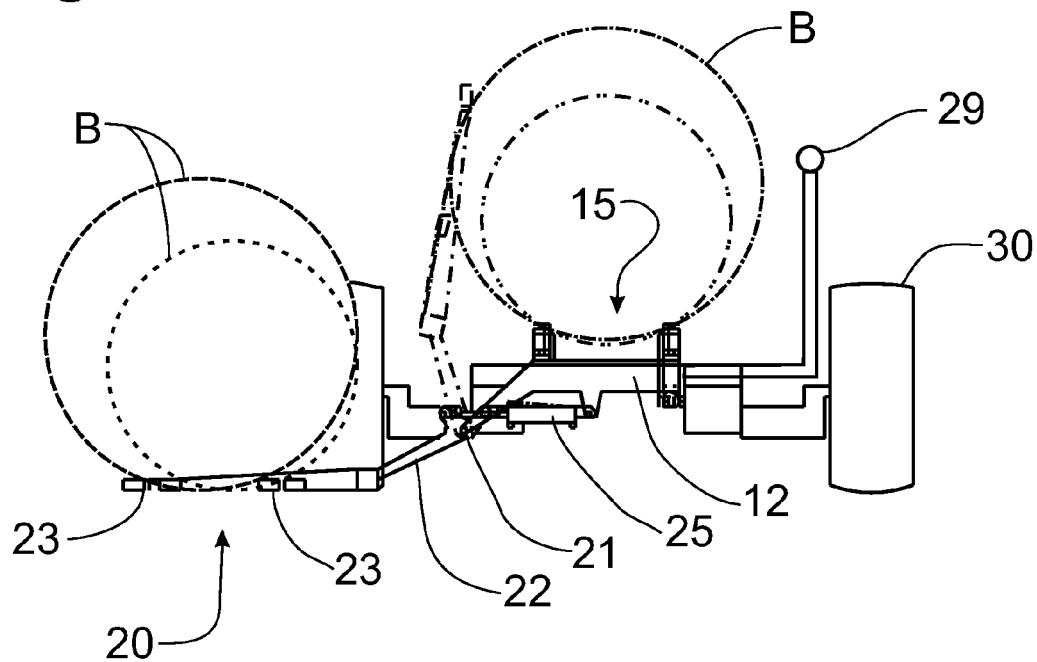
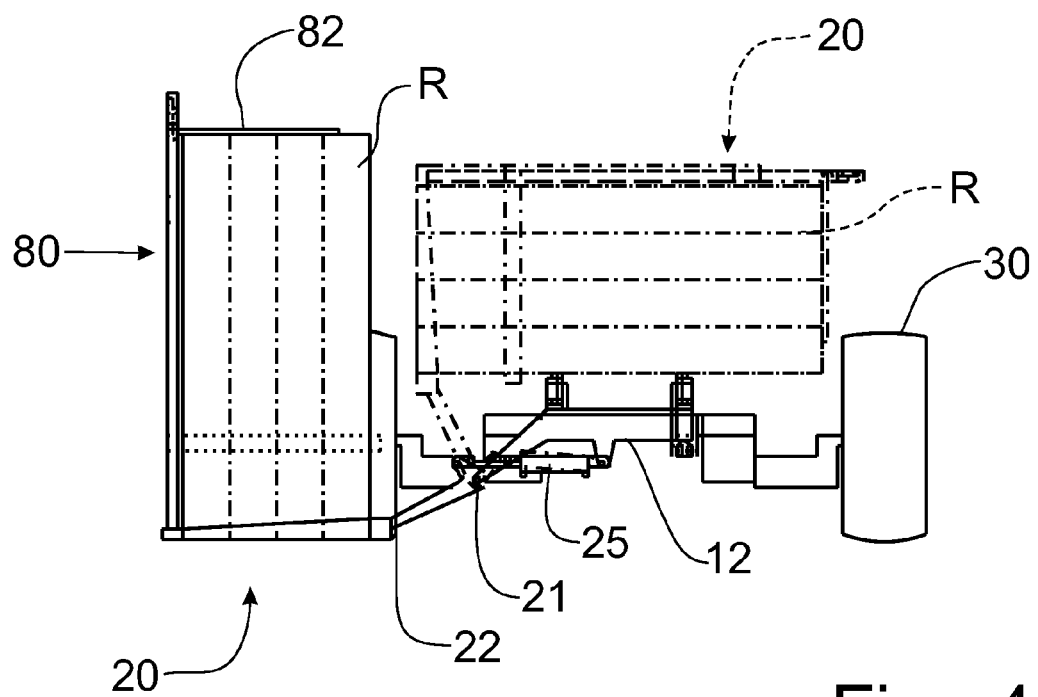
Fig. 4

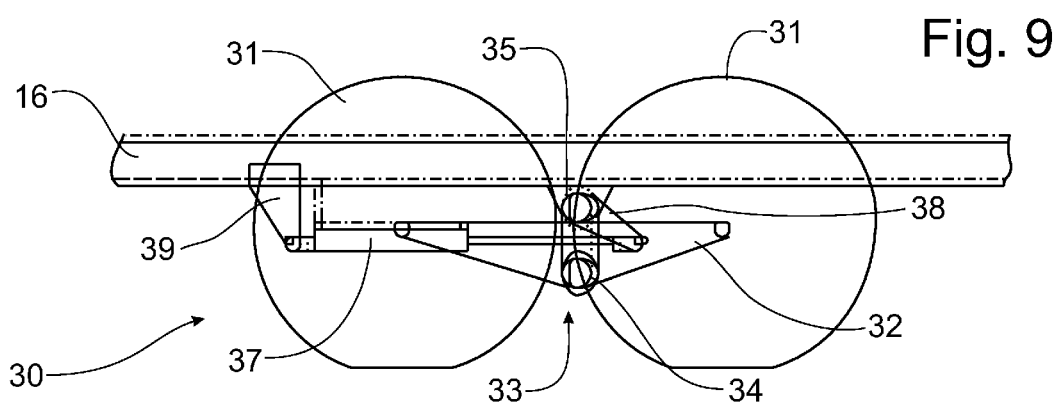
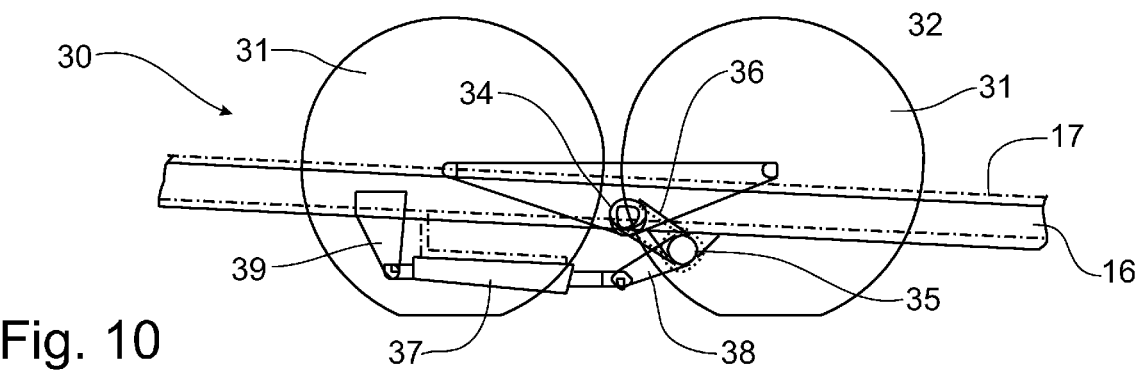

Fig. 13
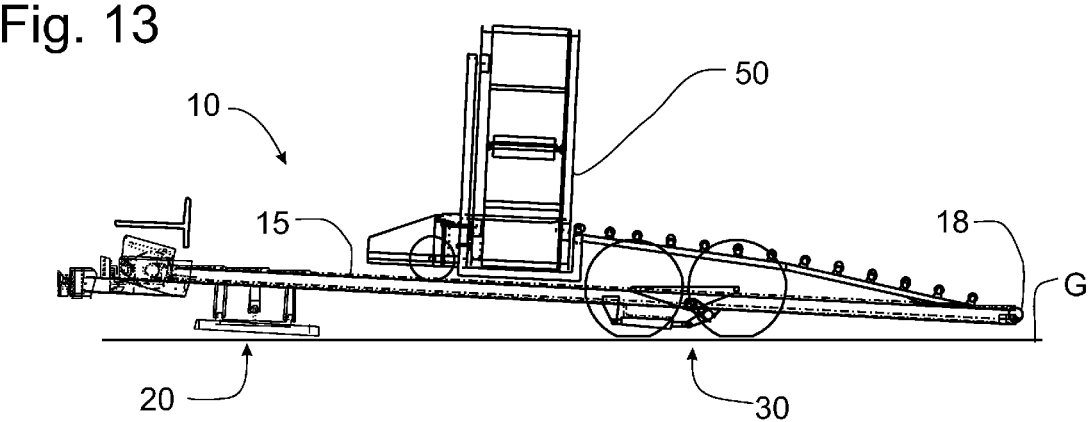
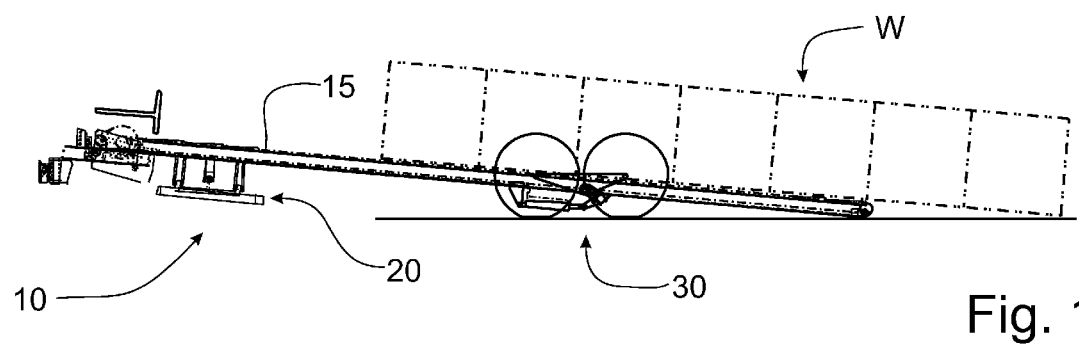
Fig. 16

Fig. 25
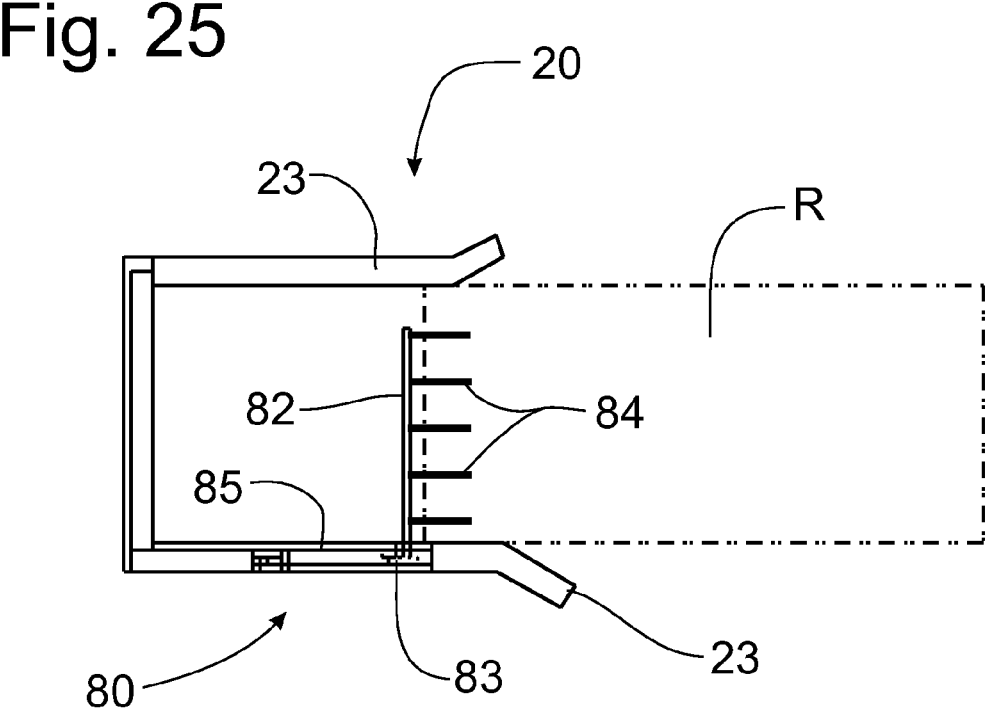
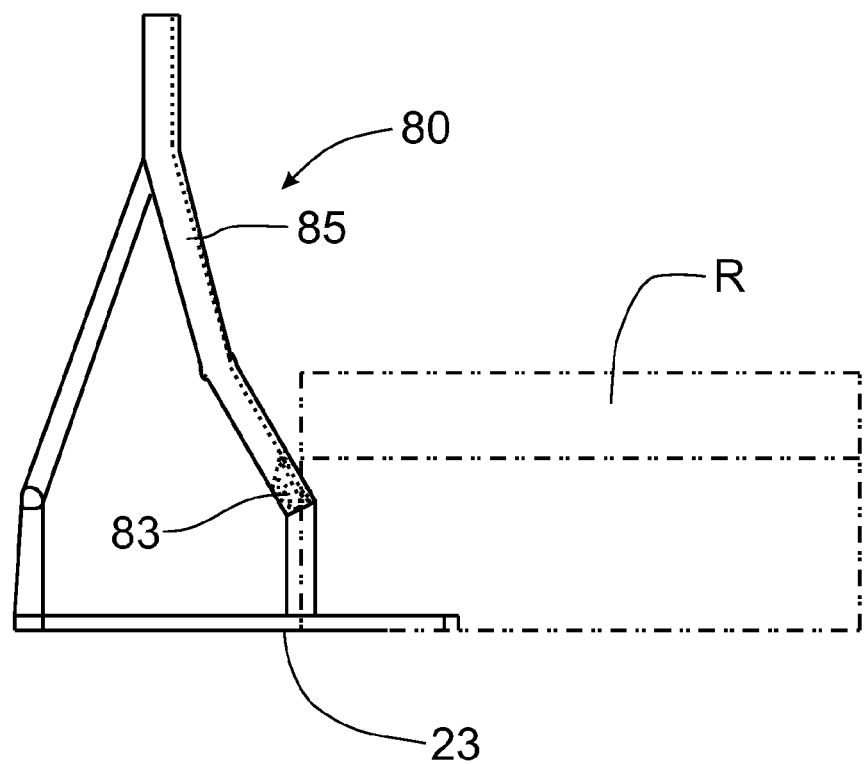
Fig. 26

Fig. 27
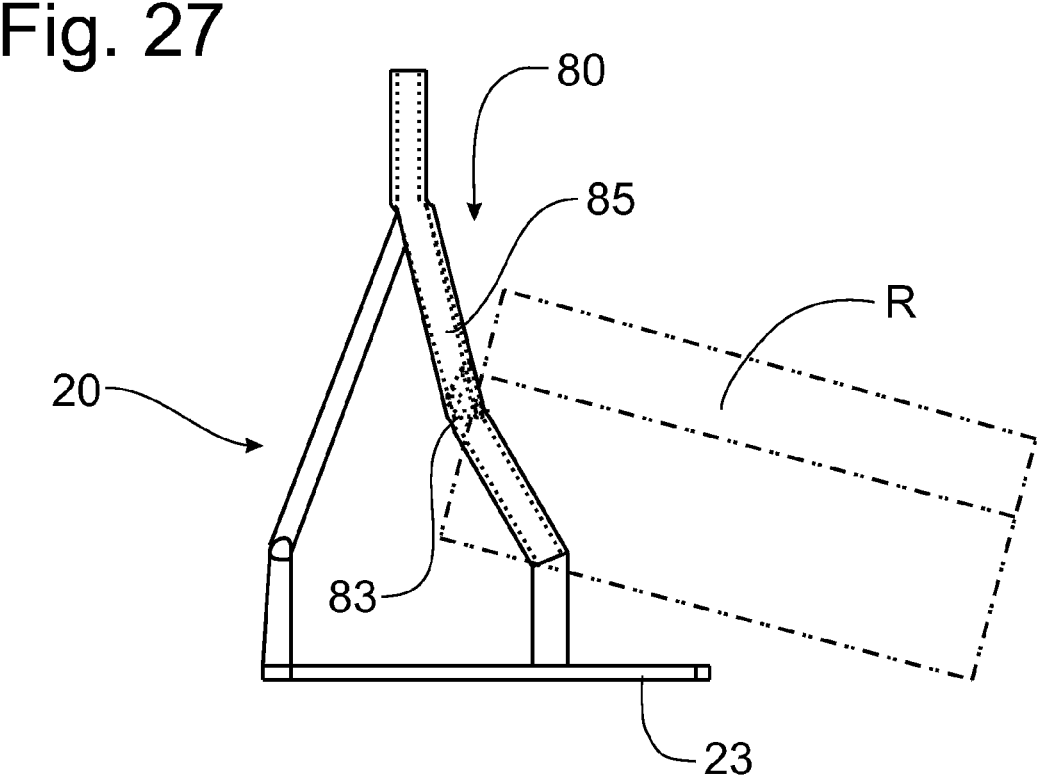
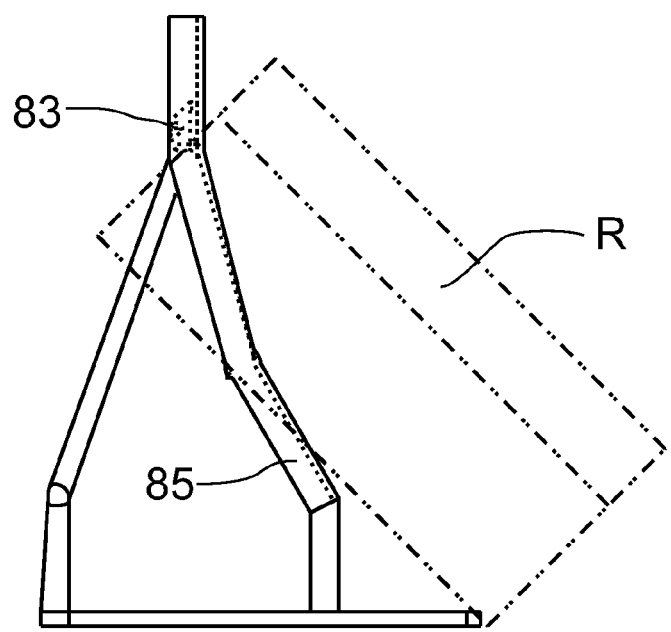
Fig. 28

Fig. 29
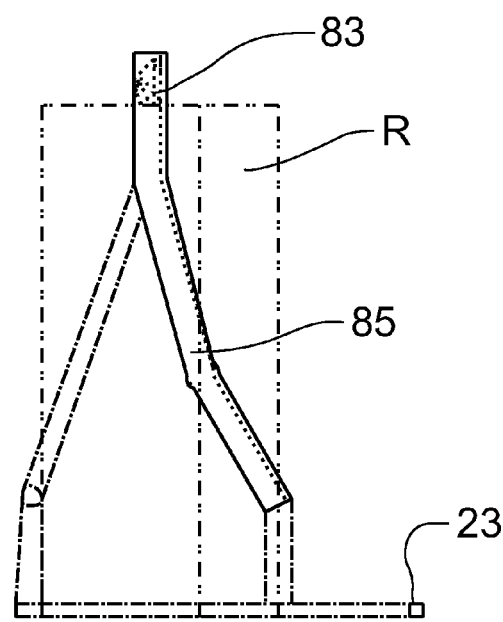
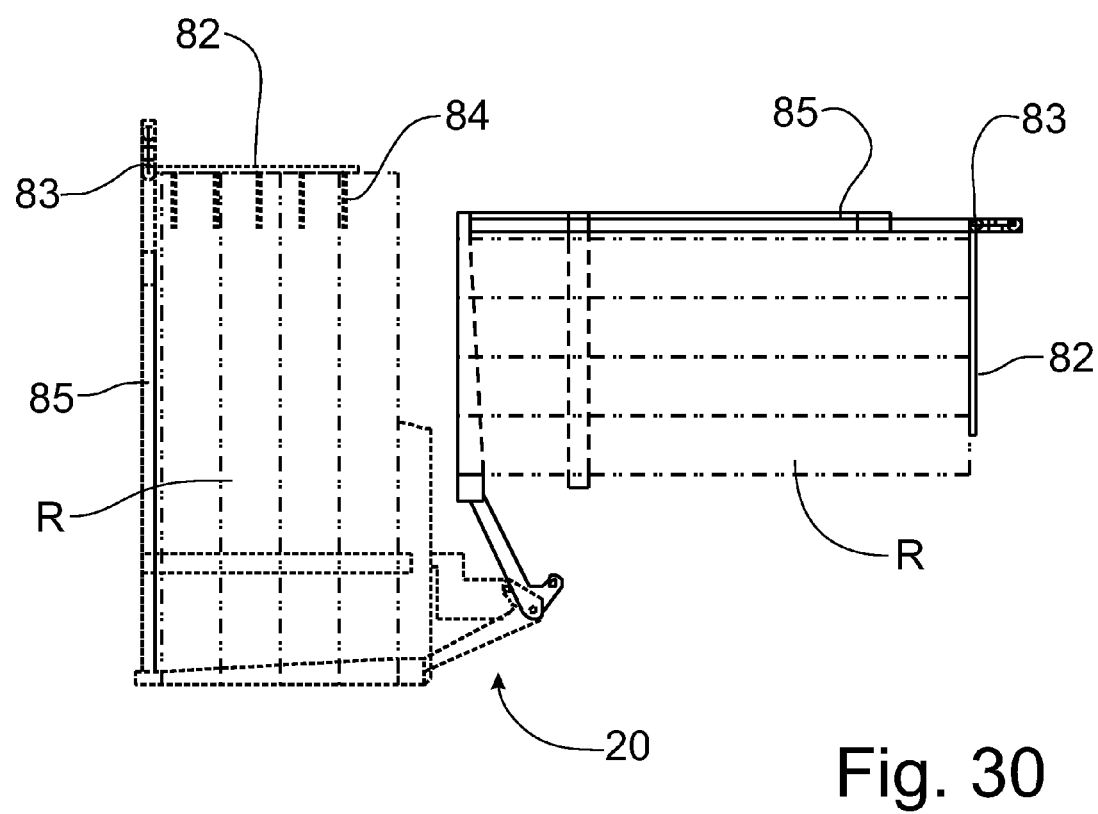
Fig. 30

Fig. 36
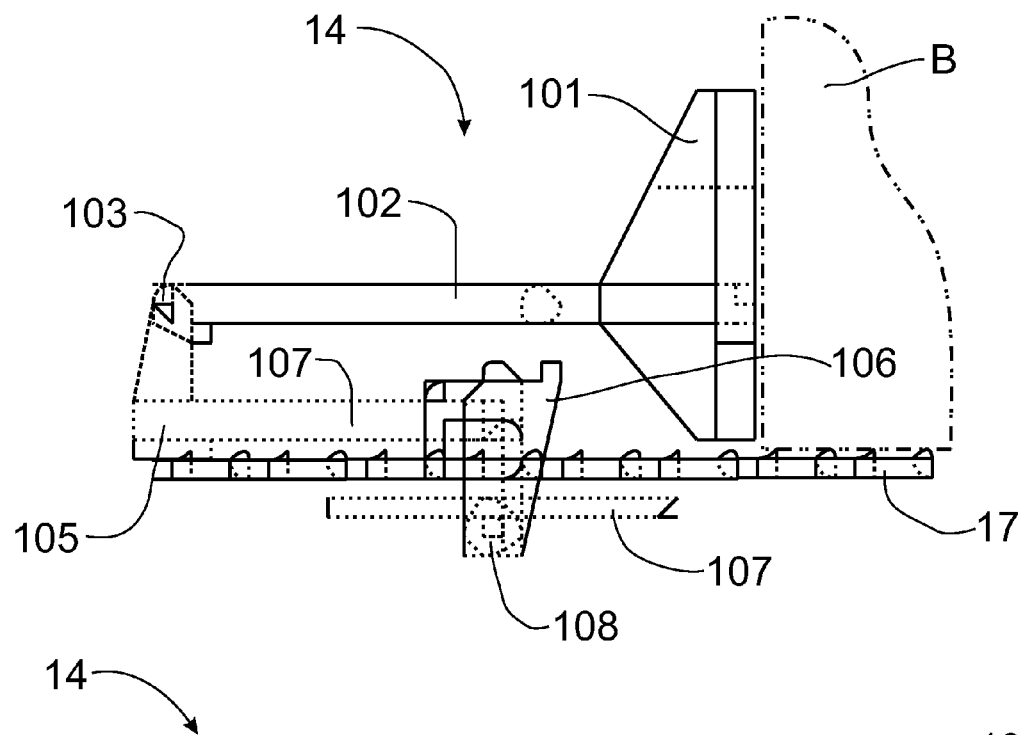
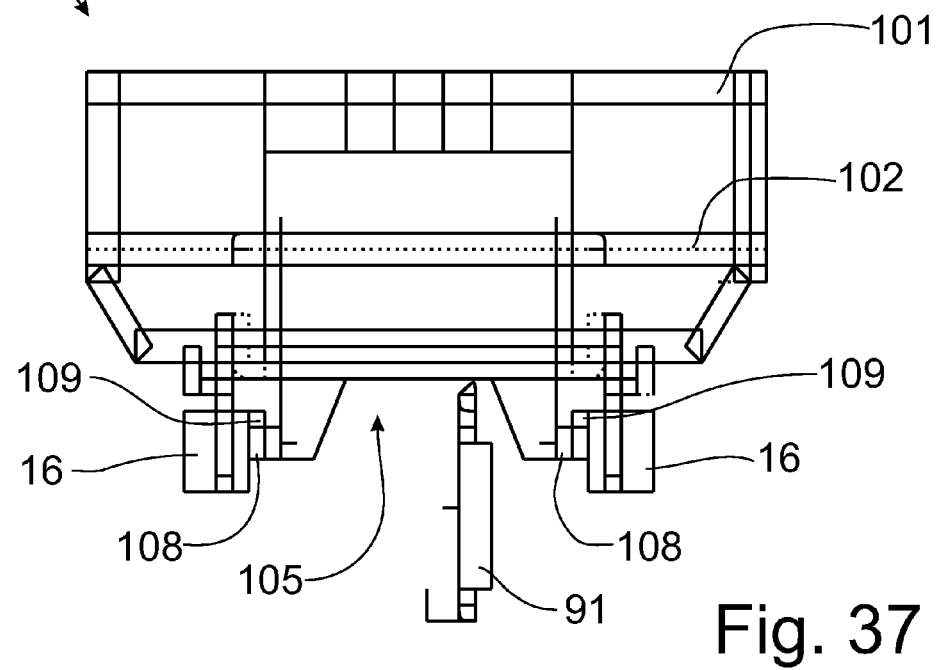
Fig. 37

Fig. 39
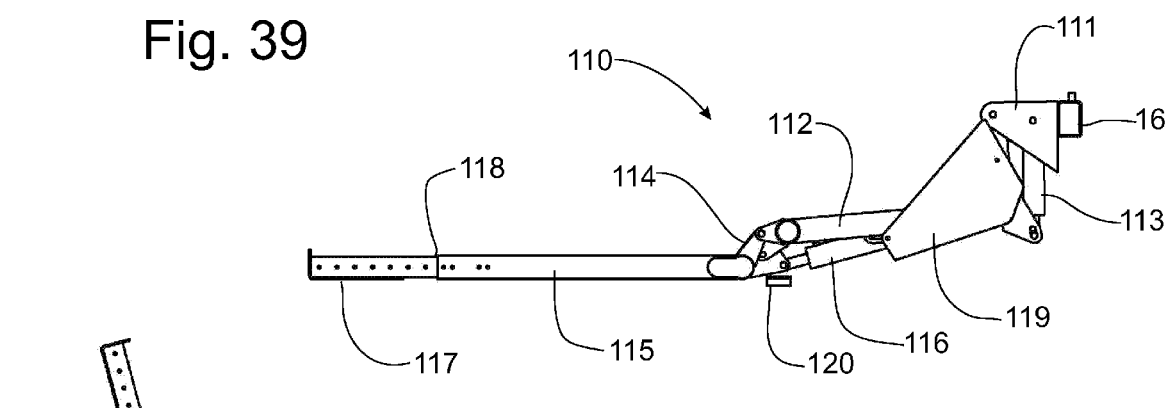
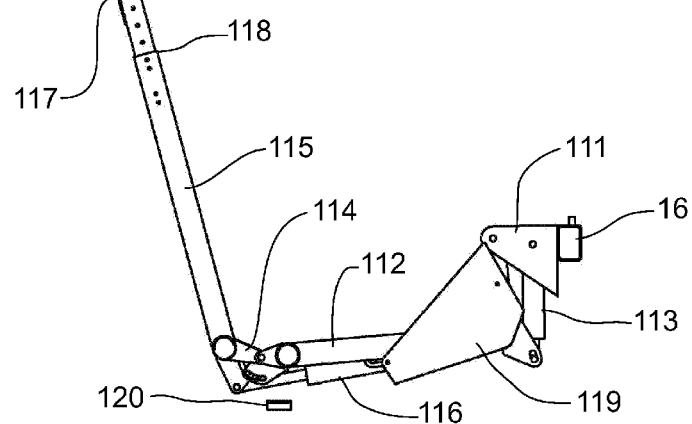
Fig. 40

Fig. 52
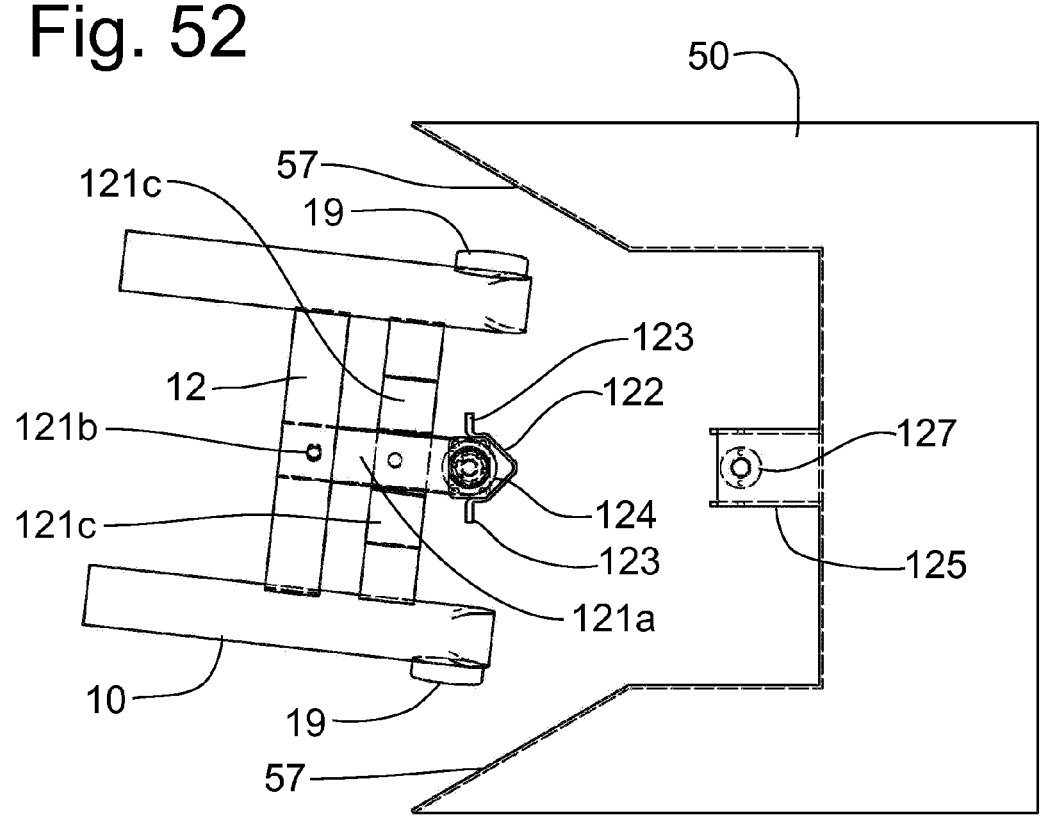
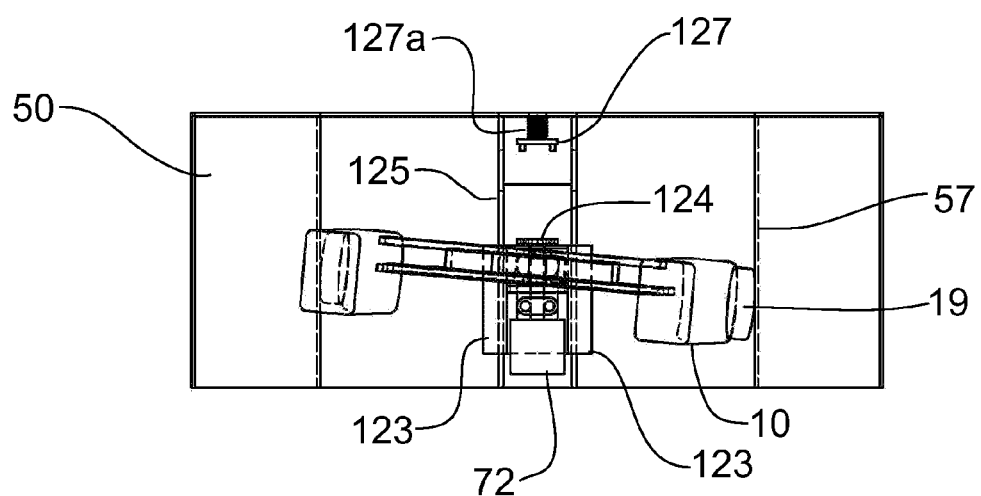
Fig. 53

SYSTEM FOR HANDLING AND WRAPPING LARGE BALES

CROSS-REFERENCE TO RELATED APPLICATIONS

This application claims domestic priority on U.S. Provisional Patent Application Ser. No. 61/225,806, filed on Jul. 15, 2009, the content of which is incorporated herein by reference.

FIELD OF THE INVENTION

The present invention generally relates to apparatus for retrieving, wrapping and transporting large bales of forage material and, more particularly, to a transporter machine cooperable with a wrapping mechanism to move and wrap both large round and large rectangular bales of forage material.

BACKGROUND OF THE INVENTION

Forage crops, such as legumes and grasses, are harvested by cutting the crop from the field, allowing the severed crop to dry and baling the dried crop into formed packages for subsequent handling. These packages of forage crop can vary widely in size from small rectangular bales that can be manipulated manually by a human to large round or rectangular bales that require mechanization to handle after being formed. Since these larger bales of forage crop can weigh 1500 pounds or more, machinery is required to pick these bales up from the field, transport them, process them and feed them to animals.

Bales of forage crop prepared at the correct moisture content can be wrapped in plastic to prevent the passage of oxygen-laden air into the bale to allow the forage material to ferment and create silage. A machine for spiral wrapping round bales of forage crop into a long continuous tube of baled forage material can be found in U.S. Pat. No. 4,793,124, granted on Dec. 27, 1988, to David W. Anderson. The apparatus in U.S. Pat. No. 4,793,124 provides a wrapping mechanism that is associated with a circular hoop that wraps a strip of plastic around the round bales of forage crop fed through the circular hoop to create a long tube-like structure comprised of a series of round bales placed end to end and wrapped in plastic.

Tractors have been utilized to bring round bales of forage crop from the field to the barn for storage or further processing. In some instances, the tractors would be provided with a lift mechanism that would be operable to engage one round bale at a time to move the round bale from the field to a storage area or a processing area. Ultimately, larger transporters were developed to make the movement of the round bales from the field be more efficient. One such large round bale transporter is found in U.S. Pat. No. 4,019,644, granted to Shaun A. Seymour on Apr. 26, 1977, in which the transporter is a pair of endless chain conveyors mounted on a wheeled frame to pick up round bales at a forward end and convey the bales toward the rear. When filled, the Seymour transporter had a line of round bales supported on the apparatus to be carried from the field to a remote location. The mechanism for elevating the round bales onto the transporter is located in line with the chain conveyors.

Another transporter apparatus can be found in U.S. Pat. No. 4,329,102, issued on May 11, 1982, to John H. Gray. The Gray transporter is similar to the Seymour transporter in that the round bales are engaged at the forward end of the machine and conveyed rearwardly to be transported in a linear configuration. The Gray transporter, however, is constructed with an offset bale pick-up mechanism that engages round bales to the side of the transporter and elevates them onto the transporter by pivoting the pick-up mechanism to move the bale from the ground onto the transporter. U.S. Pat. No. 5,071,304, issued to Vern L. Godfrey on Dec. 10, 1991, carries the collected round bales in a linear orientation above the surface of the ground, and picks up the bales by hydraulically lowering the entire transporter over the round bale before engaging and lifting the bale.

A two row transporter for round bales is shown in U.S. Pat. No. 5,700,124, granted on Dec. 23, 1997, to Charles Dufraisse. In this transporter, round bales are engaged by a pick-up mechanism located offset to the side of the transporter frame so that the pick-up mechanism will pivot to elevate a round bale from the ground onto the frame of the transporter where a pusher moves the round bales rearwardly until the first row of round bales is formed. A second pusher apparatus is then operated to move the entire row of round bales from the first position to a transversely spaced second position. The first row of round bales is then filled again to provide a two row transporter configuration for transport from the field to a remote location. This particular transporter has been coupled commercially with the spiral round bale wrapper apparatus disclosed in U.S. Pat. No. 4,793,124 with the first row of bales being fed through the circular hoop followed by the second row after being moved back onto the first row position.

In this commercial configuration, the transporter is powered by the tractor that provides motive and operative power to the transporter, but the wrapper mechanism is powered by its own on-board engine to operate independently of the transporter and the tractor. However, in the specification of U.S. Pat. No. 5,700,124, an automatic coupling device is suggested as being available to hydraulically couple the wrapper apparatus to the hydraulic system of the tractor connected to the transporter. Certainly, a manual connection of hydraulic hoses from the tractor to the wrapper apparatus is possible, although such manual operation requires the operator of the tractor to dismount from the tractor and manually connect the hydraulic hoses to the connecting ports of the wrapper apparatus.

It would be desirable to provide a large bale transporter apparatus that would be operable to engage both large round bales and large rectangular bales of forage crop to pick the bales up from the field after being baled and transport them to a remote location.

It would also be desirable to provide a transporter apparatus that would be operable to be coupled to a wrapping machine to cause the bales being transported to be spiral wrapped with a plastic strip without requiring the operator to dismount from the tractor to cause the wrapping machine to be operatively powered.

It would further be desirable to provide a transporter apparatus that would be operable to retrieve a line of spiral-wrapped bales from a remote location for transport therefrom.

SUMMARY OF THE INVENTION

It is an object of this invention to provide a system for handling and wrapping large bales of forage material that overcomes the disadvantages of the prior art.

It is another object of this invention to provide a large bale transporter that picks up bales of forage material left on the ground after the conventional baling process to move the bales of forage material to a remote location.

It is an advantage of this invention that the transporter can be utilized to load both large rectangular bales and large round bales of forage material.

It is a feature of this invention that the large bale transporter can be coupled to a bale wrapper through which the large bales of forage material is passed directly from the transporter.

It is another feature of this invention that the bale wrapper is adapted for connection to the rear of the transporter when positioned to receive large bales therefrom.

It is another feature of this invention that the bale wrapper is formed with a centering structure to facilitate alignment of the bale wrapper on the rearward end of the transporter frame.

It is still another feature of this invention that the bale wrapper can be transported on the large bale transporter for movement from one location to another.

It is an advantage of this invention that the bale wrapper can be selectively positioned at a job site before the transporter is utilized to retrieve large bales of forage material to be wrapped thereby.

It is still another object of this invention to provide a bale wrapping apparatus that is operatively connected to the drive mechanism on the large bale transporter to receive operative power therefrom to operate the bale wrapping apparatus.

It is another feature of this invention that the operative power to run the bale wrapping apparatus is provided by a drive connection with the large bale transporter.

It is another advantage of this invention that the bale wrapper can be manufactured without a power plant to drive the operation of the bale wrapping apparatus.

It is yet another feature of this invention that the large bale transporter is constructed with a hydraulic motor mounted at the rear of the frame of the transporter for coupling to the bale wrapping apparatus to drive the operation thereof.

It is a further feature of this invention that the bale wrapper is provided with a drive coupler that allows an automatic connection with the hydraulic motor carried on the rearward end of the large bale transporter.

It is another feature of this invention that the wrapper apparatus includes a switch that starts the operation of the wrapping mechanism when a large bale is moved into the wrapper apparatus from the transporter so that the wrapping of the large bales starts automatically with the positioning of a bale in the wrapping apparatus.

It is yet another advantage of this invention that the hydraulic motor for driving the operation of the bale wrapping apparatus is powered from the hydraulic system of the large bale transporter.

It is another object of this invention to form the large bale transporter with a mechanism that enables the rear end of the large bale transporter to be lowered for engagement with the bale wrapper for connection therewith.

It is still another feature of this invention that the connection between the frame of the large bale transporter and the wheeled axle providing mobile support of the transporter incorporates a pivot that enables the frame to be pivoted relative to the axle to allow the rearward end of the transporter frame to be lowered toward the ground.

It is yet another advantage of this invention that the pivotal movement between the transporter frame and the wheeled axle is controlled by a hydraulic cylinder that is selectively controlled.

It is another advantage of this invention that the line of sight from the tractor to the rearward end of the transporter is enhanced by lowering the rearward end of the transporter to improve the ability to connect the transporter to the wrapper apparatus or to retrieve wrapped bales from the ground.

It is still another advantage of this invention that the lowering of the rearward end of the transporter frame enables the loading of the bale wrapper onto the frame of the large bale transporter.

It is a further advantage of this invention that the lowering of the rearward end of the large bale transporter enables the transporter to be utilized to retrieve bales that had been wrapper previously.

It is a further feature of this invention that the frame of the large bale transporter supports a chain mechanism that underlies the large bales when carried on the frame of the transporter.

It is still a further feature of this invention that the chain mechanism is entrained on a rear sprocket that is associated with a roller device for engaging beneath previously wrapped bales to pull the bales onto the load bed of the transporter.

It is still a further advantage of this invention that the chain mechanism is operably drivable in opposing directions with one direction being operable to discharge the bales on the transporter bed into the bale wrapper and the other direction being operable to load bales and/or the bale wrapper onto the transporter bed.

It is a further object of this invention to provide a loading apparatus that is operable to load large round and/or rectangular bales from the ground onto the load bed of the transporter.

It is a feature of this invention that the bale loading apparatus incorporates a two stage lift mechanism that allows the engage large bale to be first lifted from the ground and then moved onto the load bed of the transporter.

It is another feature of this invention that the bale loading mechanism can incorporate a large rectangular bale orientation mechanism that orients a large rectangular bale on the bale loading apparatus for proper placement on the load bed of the transporter.

It is an advantage of this invention that the large bale transporter is operable to transport either large round bales or large rectangular bales of forage material to be fed into the bale wrapping apparatus.

It is still another feature of this invention that the large bale transporter can be operatively connected to a prime mover, such as a farm tractor, to provide motive power for moving the transporter over the surface of the ground.

It is another advantage of this invention that the prime mover can also provide the hydraulic power for operation of the hydraulic system on the large bale transporter.

It is yet a further feature of this invention that the large bale transporter can carry a pusher member that is selectively mounted on the chain mechanism driving a load of large bales into the bale wrapping mechanism, It is yet a further advantage of this invention that the pusher member keeps the chain mechanism from losing engagement with the large bales loaded onto the load bed of the transporter to be driven into the bale wrapping apparatus.

It is still a further feature of this invention that the pusher member causes a disconnection of the drive mechanism interconnecting the operative power carried by the transporter and the bale wrapping apparatus on the bale wrapper when the pusher member reaches the bale wrapper after the last large bale has been moved into the bale wrapper.

It is still a further advantage of this invention that the driving power to the bale wrapping apparatus is interrupted when the last large bale on the load bed has been moved into the bale wrapper to stop the wrapping action of the bale wrapping apparatus.

It is another feature of this invention that the engagement of the pusher member with the chain mechanism is selectively controlled with a hydraulic cylinder.

It is still another object of this invention to provide a method of operating an implement to transport and wrap large bales of forage material.

It is still another feature of this invention that the transporter is connectable to a prime mover to provide the motive and operable power for the transporter.

It is still another advantage of this invention that the tractor, transporter and wrapper are operated in a linear manner with the large bales on the transporter being aligned between the tractor and the wrapper.

It is yet another advantage of this invention that the tractor is not offset from the line of large bales being conveyed into the wrapper apparatus.

It is yet another feature of this invention that the operation of the implement to wrap large bales of forage material results in the tractor, transporter and wrapper being moved forwardly as the large bales are moved through the wrapper apparatus.

It is still a further object of this invention to provide a large bale transporter that has sensors corresponding to the orientation of the transporter, as well as the location of bales on the transporter, to control the drive mechanism for the transporter and the wrapper apparatus when connected to the transporter.

It is a further feature of this invention that the transporter includes a sensor to indicate the location of a bale in the front position to limit the operation of the lift mechanism to move another bale into the first position until the existing bale is moved, a sensor to indicate the location of a bale in the rear position to signal a full load and to indicate that all of the bales have been unloaded to the wrapper, and a sensor to indicate the connection of the wrapper apparatus to the transporter, a sensor to indicate the lowering of the rearward end of the transporter.

It is yet another object of this invention to provide a large bale transporter and bale wrapper system for retrieving large bales of forage material from the ground after being bales by a conventional baling process to wrap the large bales with plastic for placement at a desired location, which is durable in construction, inexpensive of manufacture, carefree of maintenance, facile in assemblage, and simple and effective in use.

These and other objects, features and advantages are accomplished according to the instant invention by providing a large bale transporter and an accompanying bale wrapper to create a system for wrapping plastic around large bales retrieved by the transporter. The transporter has a loading apparatus that deposits large bales onto the load bed of the transporter until filled. The transporter is then manipulated to connect to a bale wrapper physically and operatively so that the bales can be moved into the wrapping apparatus. The frame of the transporter is pivotally connected to the axle to allow the rear end of the frame to be lowered to the ground to engage the bale wrapper and/or retrieve previously wrapped bales. The wrapping apparatus is powered by the drive mechanism of the transporter and is automatically disengaged when a pusher member placed at the end of the bales being discharged engages the drive coupler. An endless chain drive is drivable in opposite directions to move the bales on the transporter.

BRIEF DESCRIPTION OF THE DRAWINGS

The advantages of this invention will be apparent upon consideration of the following detailed disclosure of the invention, especially when taken in conjunction with the accompanying drawings wherein:

FIG. 3 is a partial cross-sectional view of the transporter corresponding to lines 3-3 with two differently sized round bales being depicted on the pick-up mechanism, the positioning of the round bales on the transporter being shown in phantom;

FIG. 4 is a partial cross-sectional view of the transporter similar to that of FIG. 3, but showing the loading of large rectangular bales instead of round bales;

FIG. 9 is a partial elevational view of the central part of the transporter showing the axle arrangement in the normal operating configuration with the transporter bed being substantially horizontal;

FIG. 10 is a partial elevational view of the central part of the transporter similar to that of FIG. 8 with the axle arrangement being shown in a lowered configuration;

FIG. 13 is a left side elevational view of the transporter having the wrapper apparatus mounted on the transporter bed for movement thereof from one location to another, the transporter being moved into the tipped orientation for loading or unloading the wrapper apparatus;

FIG. 16 is a left side elevational view of the transporter in the tipped orientation to load a line of wrapped bales onto the transporter bed, the bales being shown in phantom;

FIG. 25 is a top plan view of the pick-up mechanism on the transporter incorporating a large rectangular bale cam orientation mechanism, a representative large rectangular bale being shown in phantom;

FIG. 26 is a right side elevational view of the pick-up mechanism with a large rectangular bale cam orientation mechanism as shown in FIG. 25, the representative bale being shown in phantom;

FIG. 27 is a right side elevational view of the pick-up mechanism shown in FIG. 26 but having the rearward end of the bale elevated by the cam orientation mechanism, the representative bale being shown in phantom;

FIG. 28 is a right side elevational view of the pick-up mechanism shown in FIG. 27 but with the large rectangular bale being further progressed toward a vertical orientation;

FIG. 29 is a right side elevational view of the pick-up mechanism shown in FIG. 28, but have the large rectangular bale moved into a vertical orientation, the bale being shown in phantom;

FIG. 30 is a front elevational view of the pick-up mechanism shown in FIGS. 25-29 loading a vertically oriented large rectangular bale onto the transporter bed;

FIG. 36 is an enlarged side elevational view of the push gate similar to that of FIG. 35, but showing the push gate engaged with a bale for movement thereof along the length of the transporter bed;

FIG. 37 is a front elevational view of the push gate in the inoperative home position;

FIG. 39 is a side elevational view of the pick-up mechanism shown in FIG. 38 in the lowered ale engaging position;

FIG. 40 is a side elevational view of the pick-up mechanism shown in FIG. 39 but moved into an elevating position;

FIG. 52 is a schematic top plan view of the alternative connection arrangement shown in FIG. 47 with the rearward end of the transporter being shown in both vertical and horizontal misalignment with the wrapper apparatus;

FIG. 53 is a schematic front elevational view of the alternative connection arrangement shown in FIG. 52.

DETAILED DESCRIPTION OF THE PREFERRED EMBODIMENT

Figure 1:
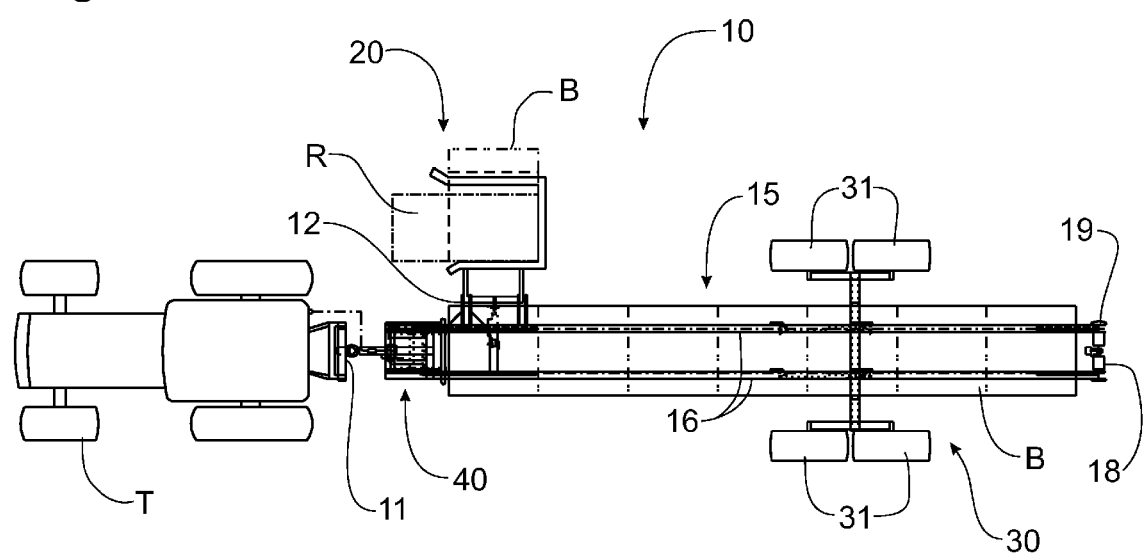
FIG. 1 is a top plan view of the transporter incorporating the principles of the instant invention, the transporter being shown connected to a tractor and as being loaded with a line of round bales depicted in phantom, the pick-up mechanism being alternatively depicted as engaging a large round bale and a large rectangular bale.

Referring to FIGS. 1-10, a transporter, incorporating the principles of the instant invention, for transporting large bales of forage crop can best be seen. Any left, right front and rear references are used as a matter of convenience and are determined by standing at the rear of the transporter 10 facing the tractor T to which the transporter 10 is connected for motive and operative power. The transporter 10 is selectively connectable to a wrapper apparatus 50, as will be described in greater detail below, to transfer large bales of forage crop through the wrapper apparatus 50 to cause a strip of plastic to be wrapped around the outer periphery of the bales for storage thereof. The transporter 10 is an implement that has a hitch 11 at the forward end thereof for connection to a tractor T in a conventional manner. Preferably, the hitch 11 is connected to the two lower links of the standard three-point hitch of the tractor T so that the front end of the transporter T can be raised or lowered as desired by manipulating the tractor's three-point hitch. The transporter 10 includes a transporter bed 15 supported on an axle mechanism 30 for movement over the surface of the ground G and a pick-up mechanism 20 mounted at the forward end of the transporter 10 offset to the right of the transporter 10 to engage large bales of forage crop for elevation onto the transporter bed 15.

Figure 31:
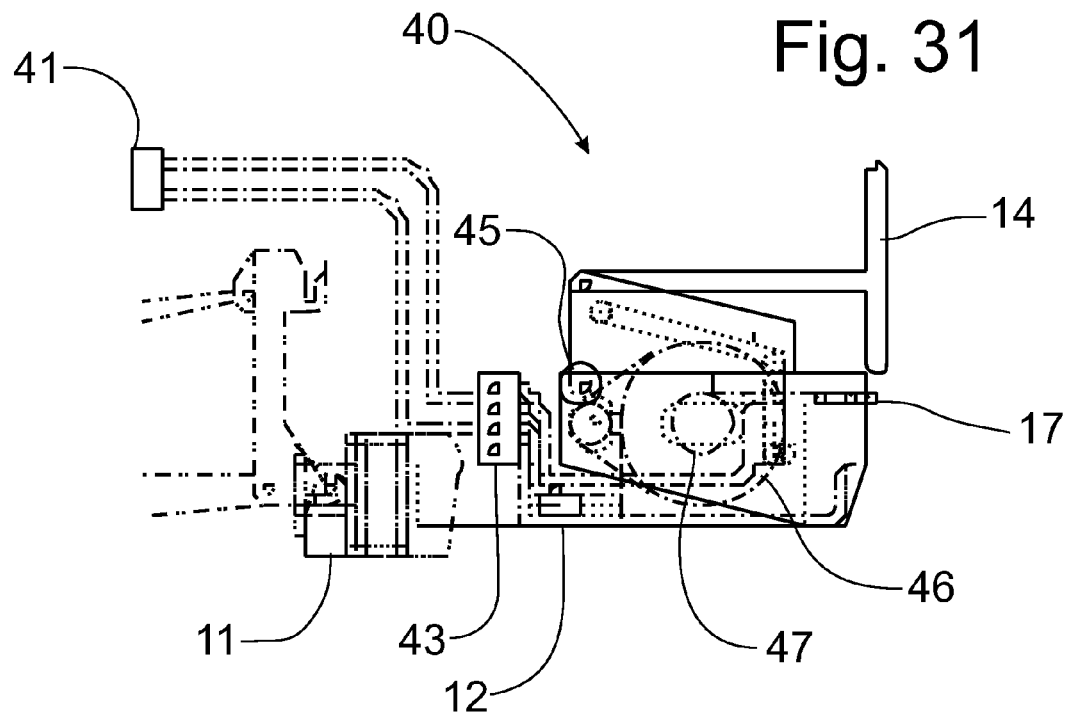
FIG. 31 is a partial left side elevational view of the forward portion of the transporter to depict the hitch and the drive components connected to the tractor.
Figure 32:
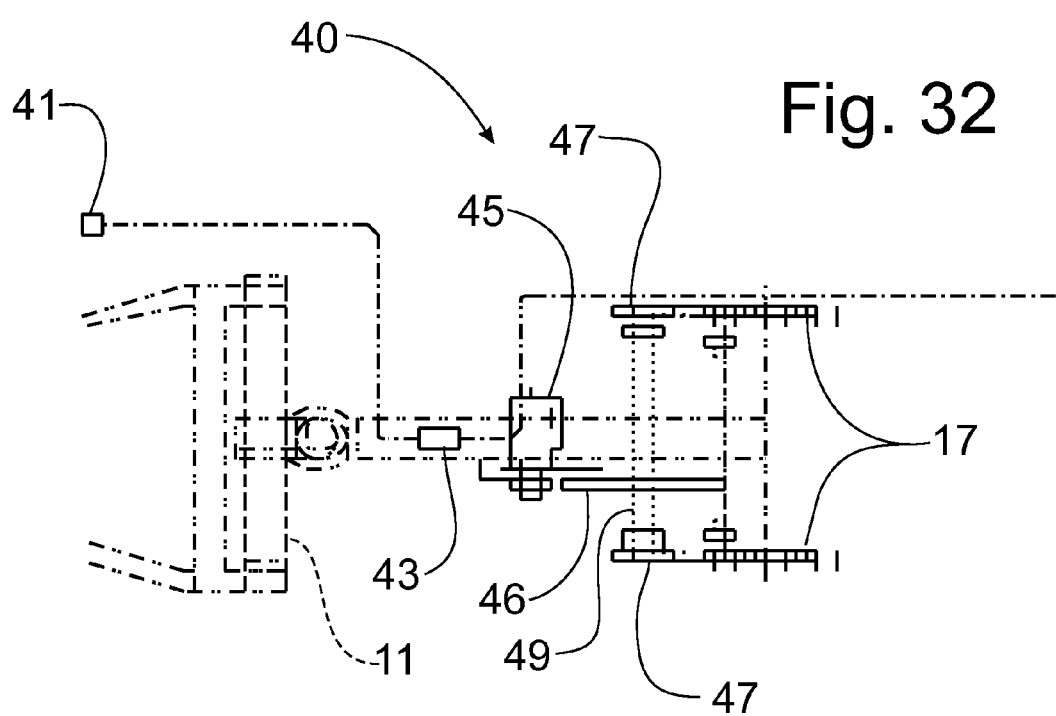
FIG. 32 is a partial top plan view of the forward portion of the transporter corresponding to FIG. 31.

The forwardmost part of the transporter 10 includes the hitch 11 and a frame 12 connected thereto. The frame 12 supports a drive mechanism 40, best seen in FIGS. 31-33, that is connected to the tractor T and drives the operation of the transporter 10 and the wrapper apparatus 50. The drive mechanism 40 is preferably hydraulic, though the drive mechanism 40 could be mechanical over hydraulic with the power takeoff mechanism (not shown) of the tractor T driving an on-board hydraulic system for the transporter 10. Typically, however, the tractor T can provide adequate hydraulic power from the hydraulic system onboard the tractor, represented by the hydraulic ports 41. The hydraulic lines connected to the tractor ports 41 are connected to a hydraulic valve 43 that is operable to divide and direct the flow of hydraulic fluid from the tractor T to the components as needed to operate the transporter 10 and the wrapper apparatus 50. The primary drive component for the transporter 10 is the hydraulic motor 45 that is operably connected to a gear reduction apparatus 46 to rotate the front drive shaft 49 of the conveyor 17 on the transporter bed 15.

The transporter bed 15 primarily consists of a pair of longitudinally extending rails 16 extending from the frame 12 at the front of the transporter 10 to the rearwardmost portion. Each rail 16 supports an endless chain conveyor 17 entrained around a drive sprocket 47 operatively connected to the gear reduction apparatus 46 to effect movement of the chain conveyor 17. Since the hydraulic motor 45 is operable in forward and reverse directions, the hydraulic motor 45 is operable to move the chain conveyor 17 both forwardly and rearwardly for the selective movement of bales on the transporter bed 15. The rails 16 are also supported by the axle mechanism 30 and terminate at the rearwardmost portion thereof in a driven sprocket 48. Both the opposing drive sprockets 47 and the driven sprockets 48 are coupled by transversely extending shafts 49 to keep the chain conveyors 17 moving in unison. The shaft 49 interconnecting the driven sprockets 48 at the rear of the transporter bed 15 has a roller 18 mounted thereon to rotate with the conveyor chains 17. Preferably, the roller 18 is formed with ribs 18a to provide an aggressive structure for digging under wrapped bales, as will be described in greater detail below, to help load wrapped bales onto the transporter bed 15.

The pick-up mechanism 20 is pivotally supported from the frame 12 to be movable between a lowered engagement position, as shown in solid lines in FIG. 3, and a loading position, as shown in phantom in FIG. 3, to deposit the bale onto the transporter bed 15. The pick-up mechanism 20 includes a subframe 22 pivotally connected to the transporter frame 12 by a longitudinally extending pivot axis 21. The subframe 22 includes a pair of forwardly projecting tines 23 that are spaced transversely a sufficient distance to be positionable on transversely opposing sides of a bale for support thereof while being elevated onto the transporter bed 15. A hydraulic cylinder 25, operably connected to the hydraulic system 90 to receive hydraulic fluid under pressure therefrom, interconnects the transporter frame 12 and the subframe 22 to cause pivotal movement of the pick-up mechanism 20 about the pivot axis 21 relative to the transporter 10.

Figure 5:
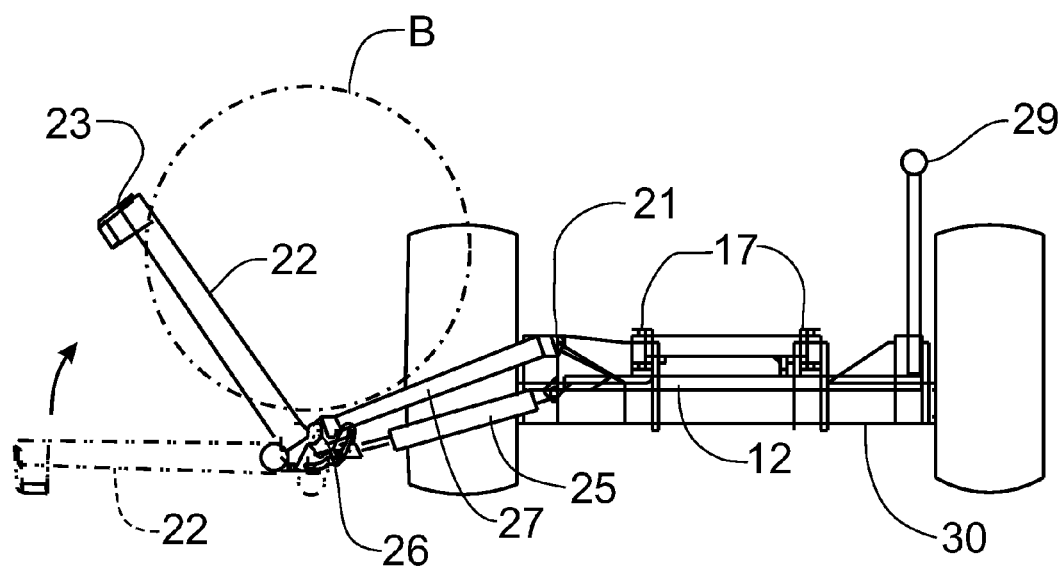
FIG. 5 is a partial cross-sectional view of the transporter similar to that of FIG. 3, but depicting a second embodiment of the pick-up mechanism to provide a two-stage lift process, the first stage to pull the center of gravity of the bale being lifted toward the transporter being shown.
Figure 6:
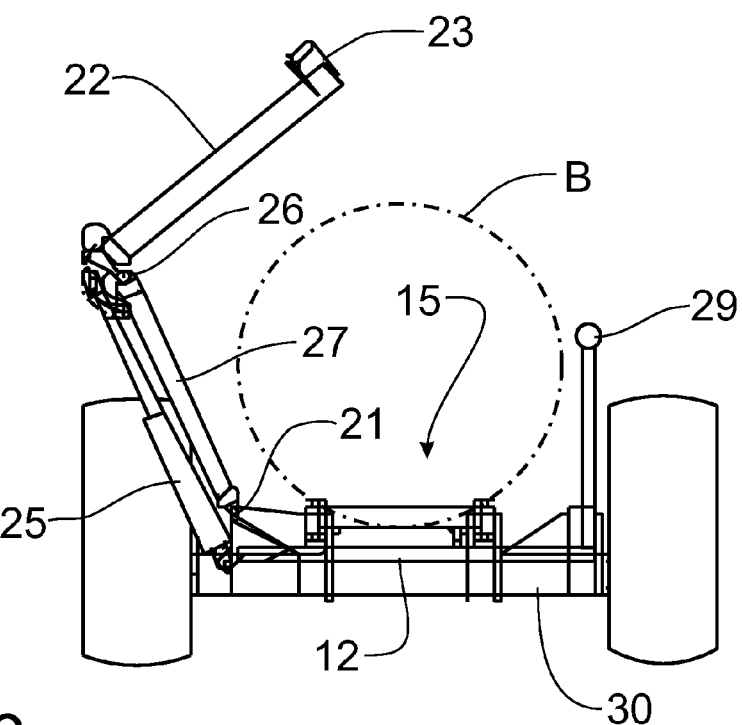
FIG. 6 is a partial cross-sectional view of the transporter similar to that of FIG. 5, but showing the bale being deposited on the transporter by the lift mechanism.
Figure 7:
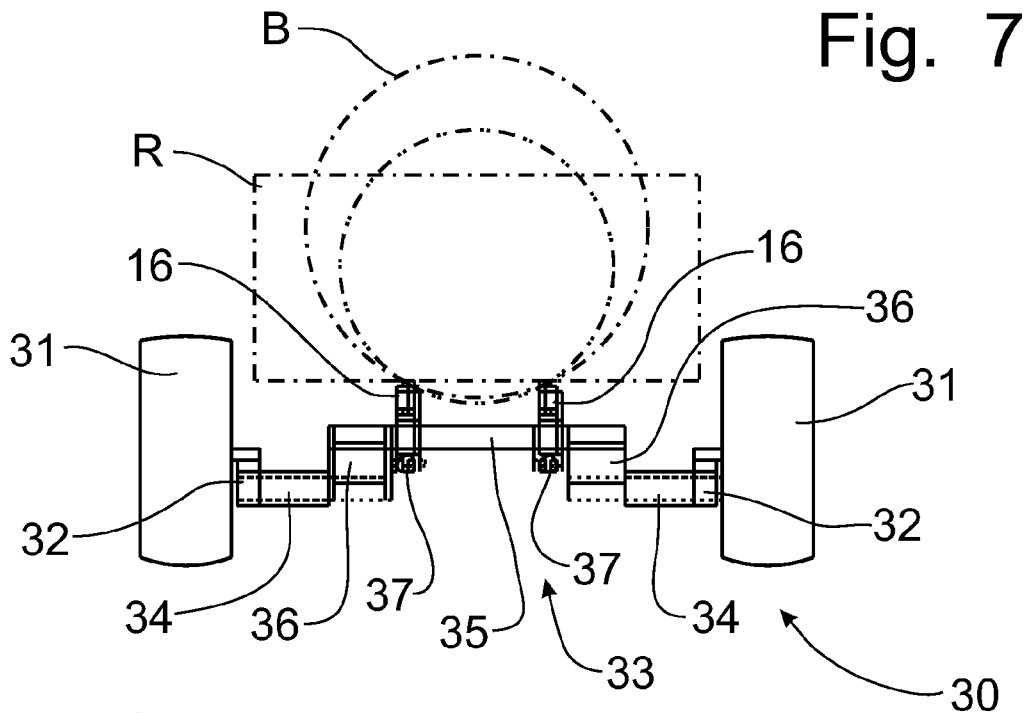
FIG. 7 is a partial cross-sectional view of the central part of the transporter to show the axle arrangement, taken along lines 7-7 of FIG. 2.
Figure 8:
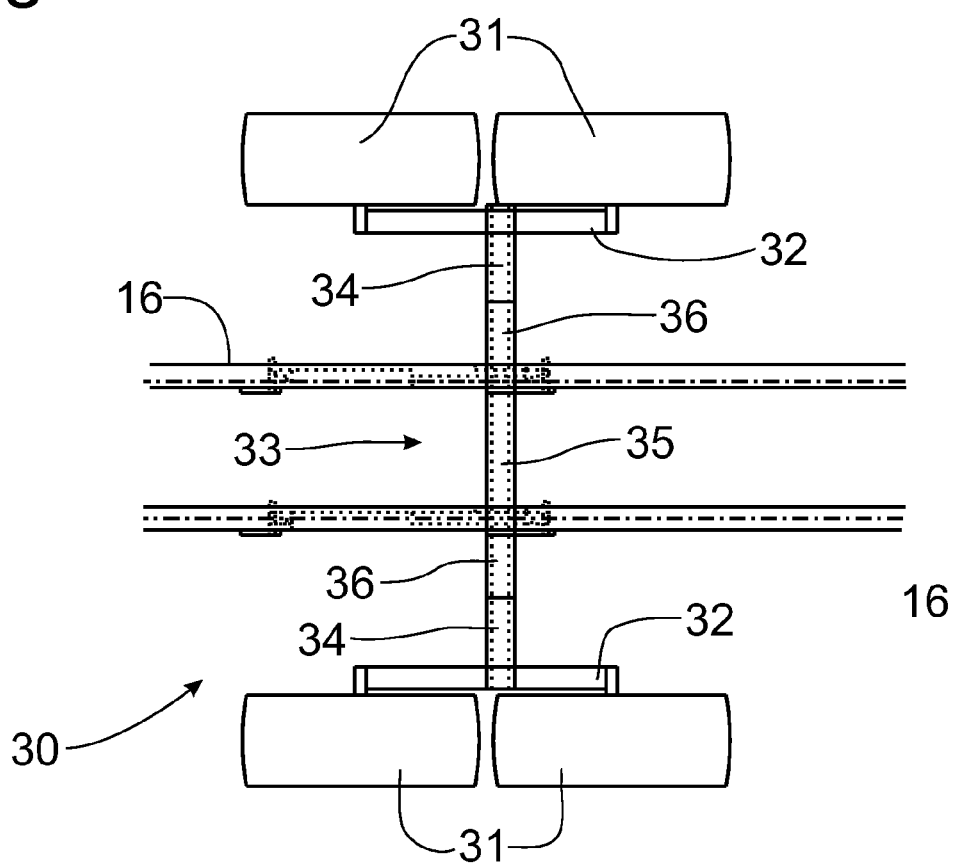
FIG. 8 is a top plan view of the central part of the transporter showing the axle arrangement.

As can be seen in FIGS. 5 and 6, the subframe 22 can be constructed with a second longitudinally extending pivot axis 26 that interconnects the tine assembly 23 and a support link 27 that extends between the first and second pivot axes 21, 26. Accordingly, the tine assembly 23 can be positioned on the surface of the ground G to follow the contours of the ground G by moving about the second pivot axis 26 relative to the support link 27. The hydraulic cylinder 25 is then positioned between the frame 12 and the tine assembly 23. When the tine assembly is positioned on the ground G to follow ground contours, the hydraulic cylinder 25 can be placed in a float condition to permit the pivotal movement of the tine assembly 23 about the second pivot axis 26. The rod of the hydraulic cylinder 25 is mounted in an arcuate track 28 to facilitate the floating movement of the tine assembly 23.

When a bale B has been engaged by the tine assembly 23 and the bale is to be lifted onto the transporter bed 15, the hydraulic cylinder 25 is extended, as shown in FIG. 5, to pivot the tine assembly 23 about the second pivot axis 26 until the tine assembly 23 hits the end of the arcuate track 28, which defines a stop corresponding to a generally perpendicular orientation of the tine assembly 23 relative to the support link 27. When the tine assembly 23 is pivoted to this first stage position generally perpendicular to the support link 27, the bale B has been shifted inwardly toward the transporter bed 15 and elevated slightly, as is demonstrated in FIG. 5. Further extension of the hydraulic cylinder 25 against the stop then affects pivotal movement of the support link 27 about the first pivot axis 21, as is demonstrated in FIG. 6, to raise the bale B onto the transporter bed 15. Preferably, a guard member 29 serves as a fence on the transporter 10 to prevent the round bale B from over-rolling the transporter bed 15 and falling off the opposite side of the transporter 10 from the pick-up mechanism 20.

Figure 2:
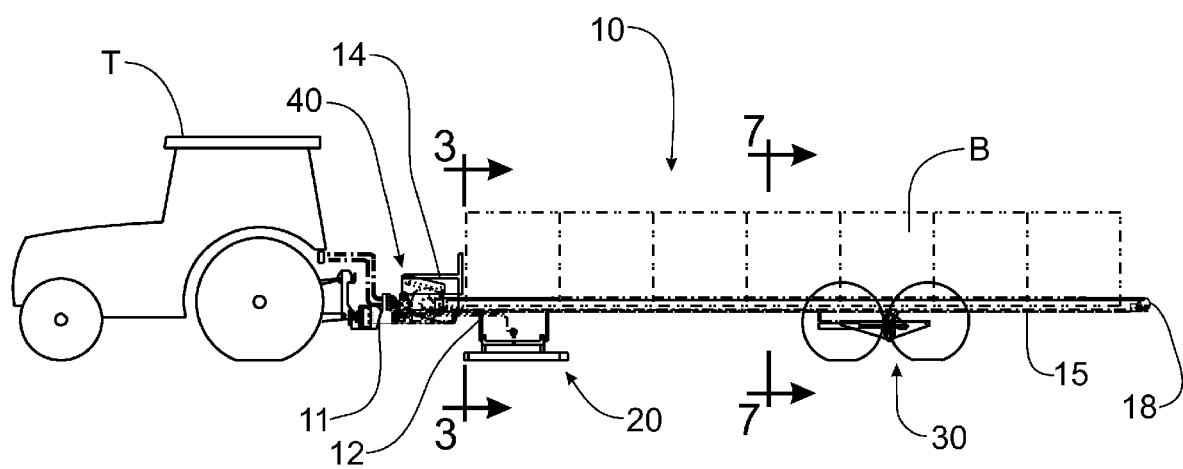
FIG. 2 is a side elevational view of the transporter connected to a tractor as shown in FIG. 1.
Figure 14:
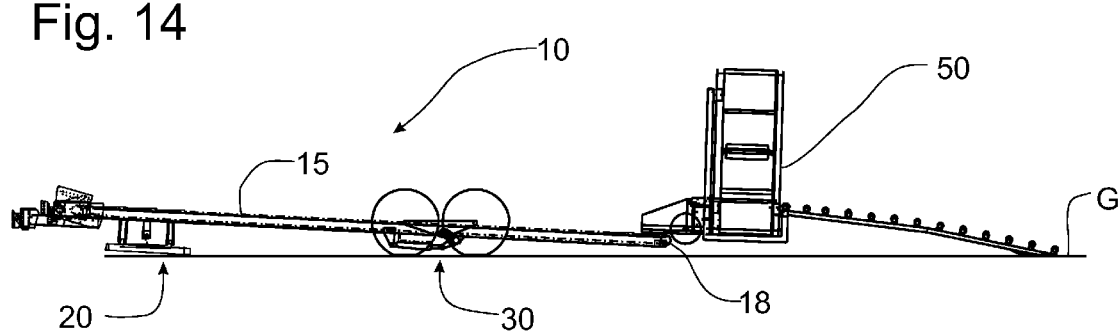
FIG. 14 is a left side elevational view of the transporter similar to that of FIG. 13 showing the wrapper apparatus engaged with only the rearward portion of the transporter bed such as to start a loading operation or finishing an unloading operation of the wrapper apparatus.

Although the front end of the transporter 10 can be raised or lowered through manipulation of the three-point hitch on the tractor T, which can be convenient to clear obstacles during movement over a field, the axle assembly 30 is configured to lower the rearward end of the transporter 10 while the front end remains at a fixed elevation. The axle assembly 30 not only supports the rails 16, but also controls the orientation of the transporter bed 15 between the normal, generally horizontally disposed, transport orientation, as shown in FIG. 2, and a tilted orientation for the loading and unloading of the wrapper apparatus and/or bales, as is depicted in FIGS. 13 and 14. Because of the weight of the bales to be supported on the transporter bed 15, which is designed to hold up to seven bales along the length of the rails 16 with an additional bale capable of being carried simultaneously in the pick-up mechanism 20, the axle assembly 30 is preferably configured as a bogie axle with a pair of wheels 31 on opposite sides of the transporter bed 15 supported on a bogie beam 32 which are connected to a transverse axle 33 interconnecting the opposing bogie beams 32. The rails 16 are supported on top of the transverse axle 33.

As best seen in FIGS. 7-10, the transverse axle 33, however, is formed a pair of stub axle members 34 connected, respectively, to the opposing bogie beams 32, and a central transverse member 35 mounted in an offset configuration by support members 36 rotatably received by the respective stub axles 34 such that the central transverse member 35 is rotatable about a transverse axis defined by the stub axles 34. Each rail 16, which is supported on top of the central transverse member 35, is provided with a hydraulic cylinder 37 anchored by anchor brackets 39 affixed to the rail 16 and connected to an actuator link 38 affixed to the central transverse member 35 in an offset manner.

As is demonstrated in FIG. 9, the extension of the hydraulic cylinders 37 orients the transverse member 35 in vertical alignment with the stub axles 34, which corresponds to the generally horizontal transport position for the transport bed 15. A contraction of the hydraulic cylinders 47, as is demonstrated in FIG. 10, pulls the actuator links 48 toward the anchor brackets 39. Since the actuator links 38 are fixed to the transverse central member 35, the movement of the actuator links 38 causes the central member to rotate about the transverse axis defined by the stub axles 34, which makes the transverse central member 35 drop relative to the stub axles 34. Since the rails 16 are positionally fixed at the forward end thereof by the connection of the hitch 11 to the tractor T, the dropping of the transverse central member 35 with the rails 16 secured thereto results in a tilting of the rails 16 to lower the rearwardmost portion of the transporter bed 15 toward the ground G. The position of the roller 18 relative to the surface of the ground G is dependent on the amount of contraction of the hydraulic cylinders 37.

Figure 34:
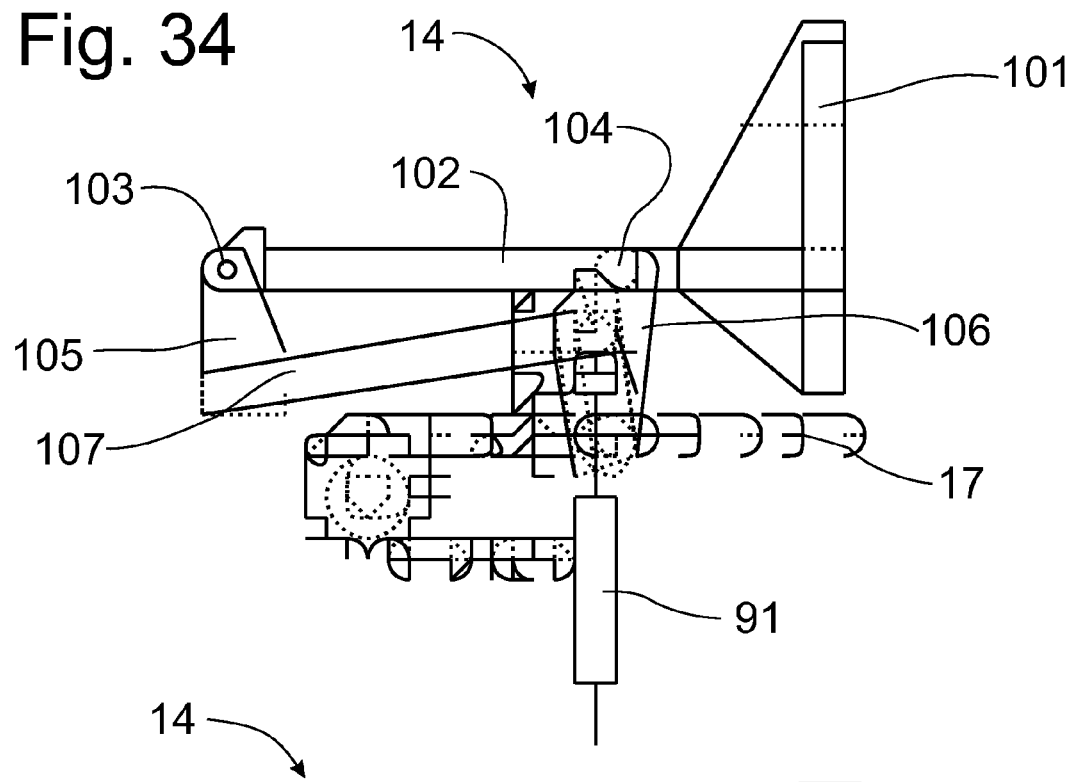
FIG. 34 is an enlarged side elevational view of the push gate shown in an inoperative position at the home position located at the forward portion of the transporter.
Figure 35:
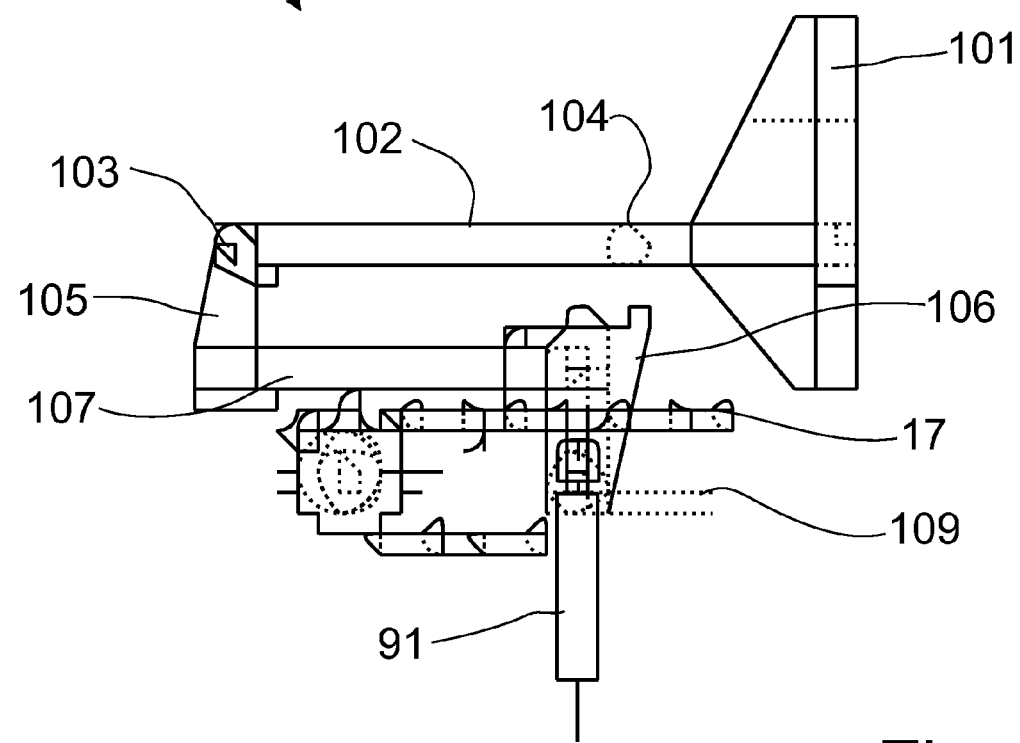
FIG. 35 is an enlarged side elevational view of the push gate similar to that of FIG. 34, but showing the push gate moved into the operative position.
Figure 38:
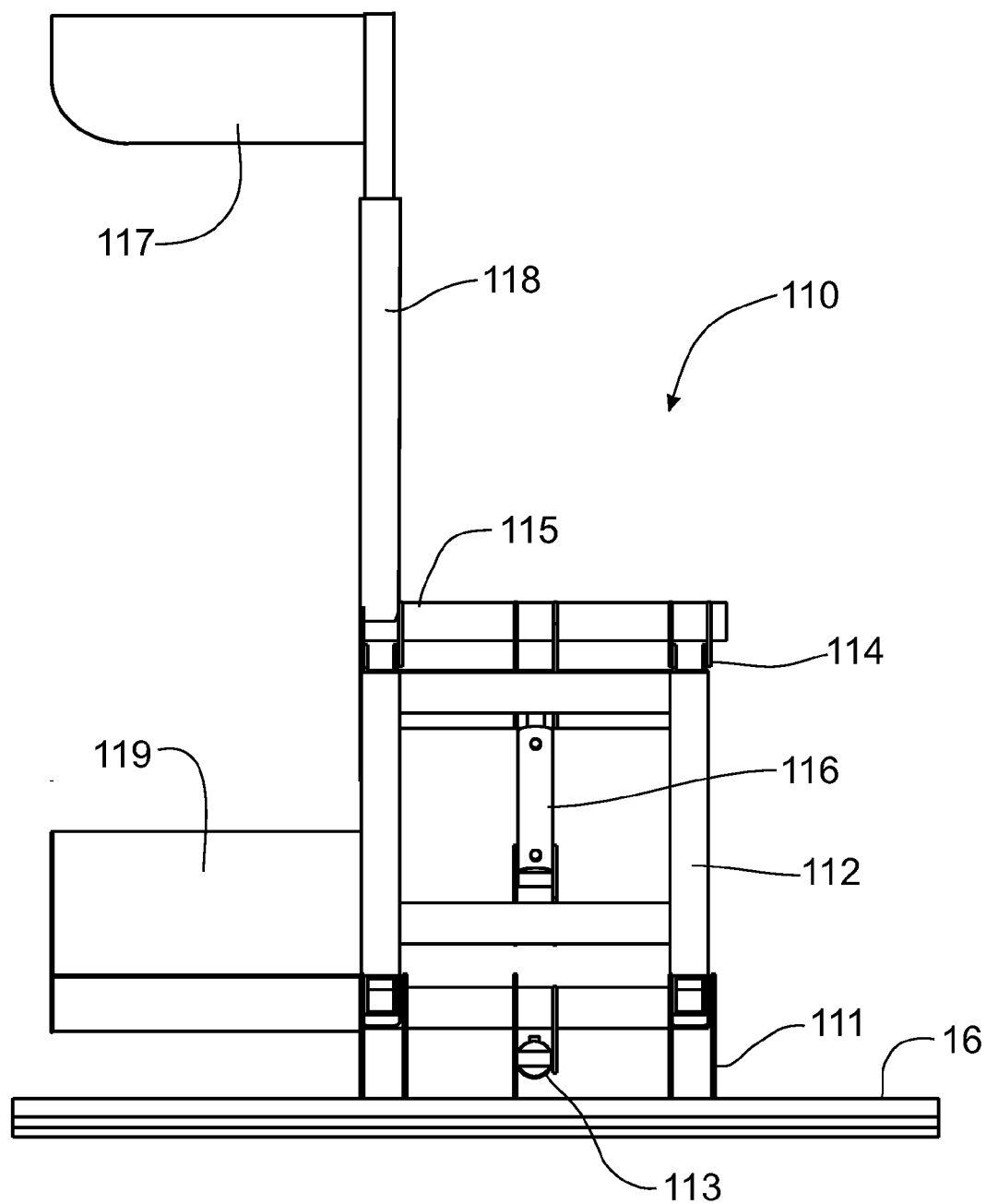
FIG. 38 is a top plan view of an alternative embodiment of the pick-up mechanism in a lowered bale engaging position.

Referring now to FIGS. 34-37, the push gate 14 is shown in its home position at the forward end of the transporter 10. In FIG. 34, the push gate 14 is deactivated by the extension of the hydraulic cylinder 91. In FIG. 35, the hydraulic cylinder 91 has been retracted to activate operation of the push gate 14, which in FIG. 36 is shown pushing a bale B rearwardly. The push gate 14 is constructed with a push head 101 that is generally vertically oriented to engage the front surface of a bale B, as shown in FIG. 36, to push the bale rearwardly with the movement of the chain conveyor 17. A push arm 102 extends forwardly from the push head 101 and supports a pivot 103 for the mounting of the activation linkage 105.

The activation linkage 105 includes a connection link 107 pivotally connected to the push arm 102 by the pivot 103 and an engagement head 106 disposed at the rearwardly distal end of the connection link 107. The engagement head 106 is configured to mate with the conveyor chain 17 for a driving connection therewith and is vertically movable through engagement with the hydraulic cylinder 91 between a lowered operative position engaged with the conveyor chain 17 (shown in FIG. 35) and a raised inoperative position disengaged from the conveyor chain 17 and positioned against the lift stop 104 carried by the push arm 102 (shown in FIG. 34). When the hydraulic cylinder 91 is extended, the engagement head 106 is lifted off the conveyor chain 17 and raised against the lift stop 104, which allows the conveyor chain to be operated in either direction, forward or rearward, without disturbing the push gate 14 from its home position. When activation of the push gate 14 is desired, the hydraulic cylinder 91 is retracted to allow the engagement head 106 drop into a driving engagement with the conveyor chain 17 so that the push gate 14 will move with the conveyor chain 17.

To assist in retaining the activation linkage 105 in driving relationship with the conveyor chain 17, the rails 16 are provided with longitudinally extending guide rails 109 that are engaged by guide rollers 108 carried by the engagement head 106. When in the inoperative home position shown in FIG. 34, the guide rollers 108 are located above the guide rails 109. When the hydraulic cylinder 91 retracts, the guide rollers 108 drop below the level of the guide rails 109, which are immediately rearward of the guide rollers 108 so that the initial movement of the push gate 14 rearwardly to engage the forwardmost bale B positions the guide rollers 108 below the guide rail 109 for the remaining length of the transporter bed 15. Accordingly, the push gate 14 is retained in position against the forwardmost bale B when engaged therewith to move the bales rearwardly through the wrapper apparatus 50, as will be described in greater detail below, and rides on top of the conveyor chains 17 when cycled forwardly to return to the home position.

Figure 11:
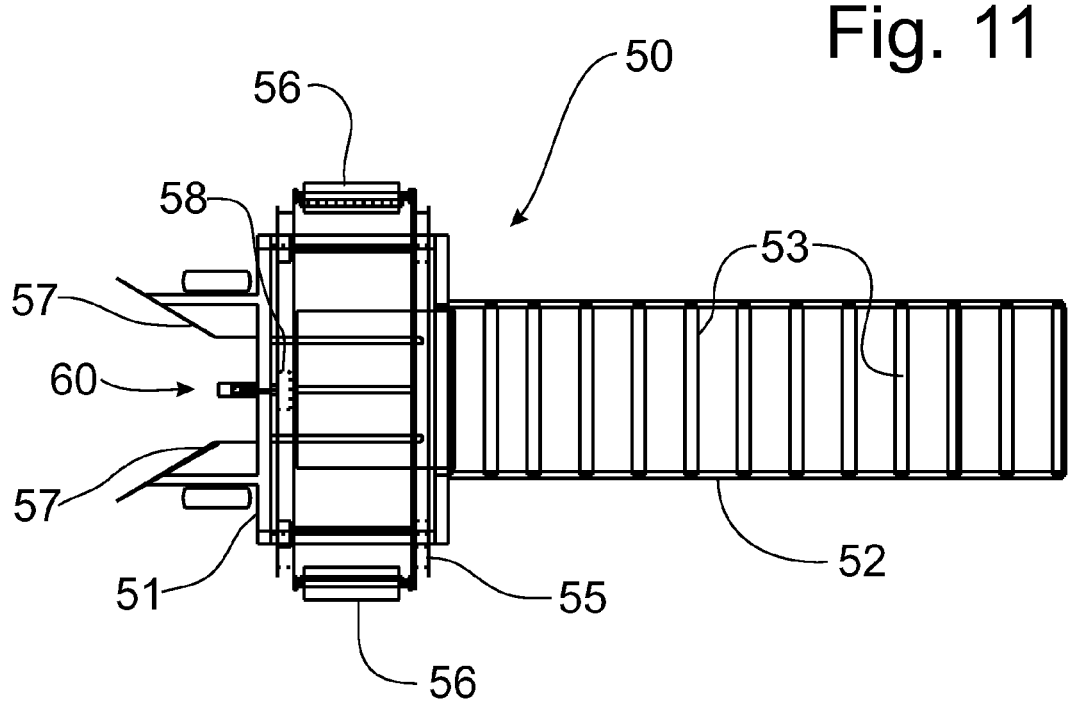
FIG. 11 is a top plan view of the wrapper apparatus incorporating the principles of the instant invention.
Figure 12:
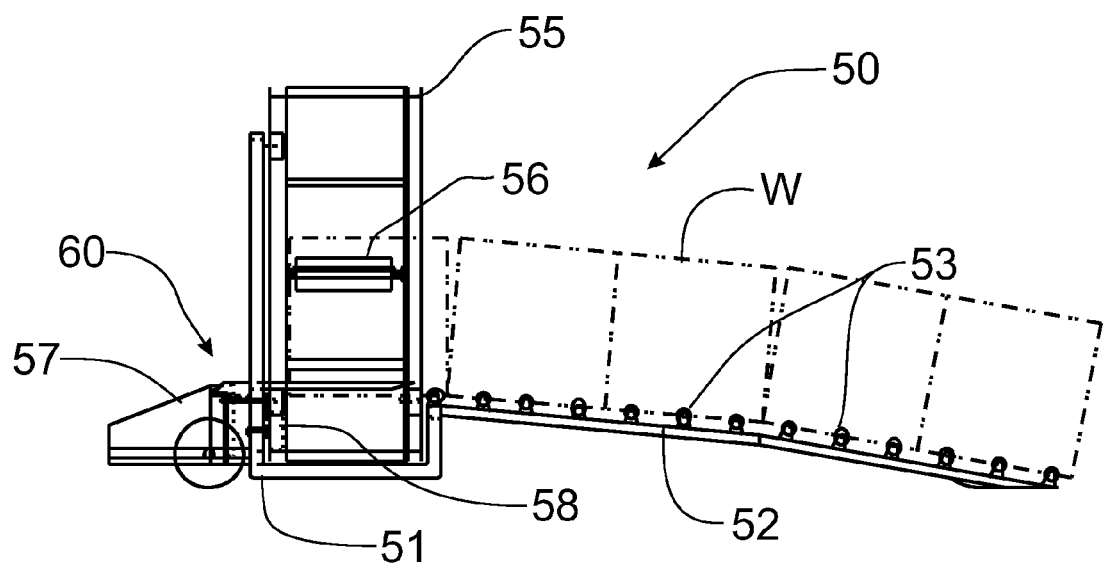
FIG. 12 is a left side elevational view of the wrapper apparatus, representative bales being wrapped being shown in phantom.

The wrapper apparatus 50 is best seen in FIGS. 11 and 12 and consists primarily of a frame supported a longitudinally extending ramp 52 having rollers 52 mounted therein to support wrapped bales W, and a circular hoop 55 containing a plastic wrapping mechanism 56 that orbits around the circular hoop 55 to wrap a strip of plastic around the bales B as they pass rearwardly through the hoop 55 and onto the ramp 52. The general operation of the wrapper apparatus 50 is known in the art, as disclosed in U.S. Pat. No. 4,793,124, and does not need to be described herein. Some significant differences exist, however, in the wrapper apparatus 50 compared to that disclosed in the aforementioned U.S. Pat. No. 4,793,124, primarily in the mechanism for powering the operation of the wrapper apparatus 50. Commercially, most such wrapping machines carry their own engine to provide operative power for the movement of the wrapping mechanism. The operative power for the wrapping mechanism 56 in the instant invention comes from the tractor T. One such possible drive mechanism would be hydraulic lines carried rearwardly by the transporter 10 for connection with a hydraulic motor (not shown) carried by the wrapper apparatus 50.

The preferred drive mechanism, however, is a mechanical connection between the transporter 10 and the wrapper apparatus 50. Such a mechanical drive mechanism 60 is best seen in FIGS. 19-24. The primary drive member for the wrapper apparatus 50 is the drive wheel 58 rotatably supported on the frame 51. The drive mechanism 60 includes a drive input shaft 61, which is rotatably supported on the frame 51 and coupled to the drive wheel 58 through a chain transfer mechanism 52. The drive mechanism 60 also includes a connection mechanism 65 at the forward end of the drive input shaft 61 to connect with the drive apparatus 70 mounted on the rear end of the transporter 10.

Figure 19:
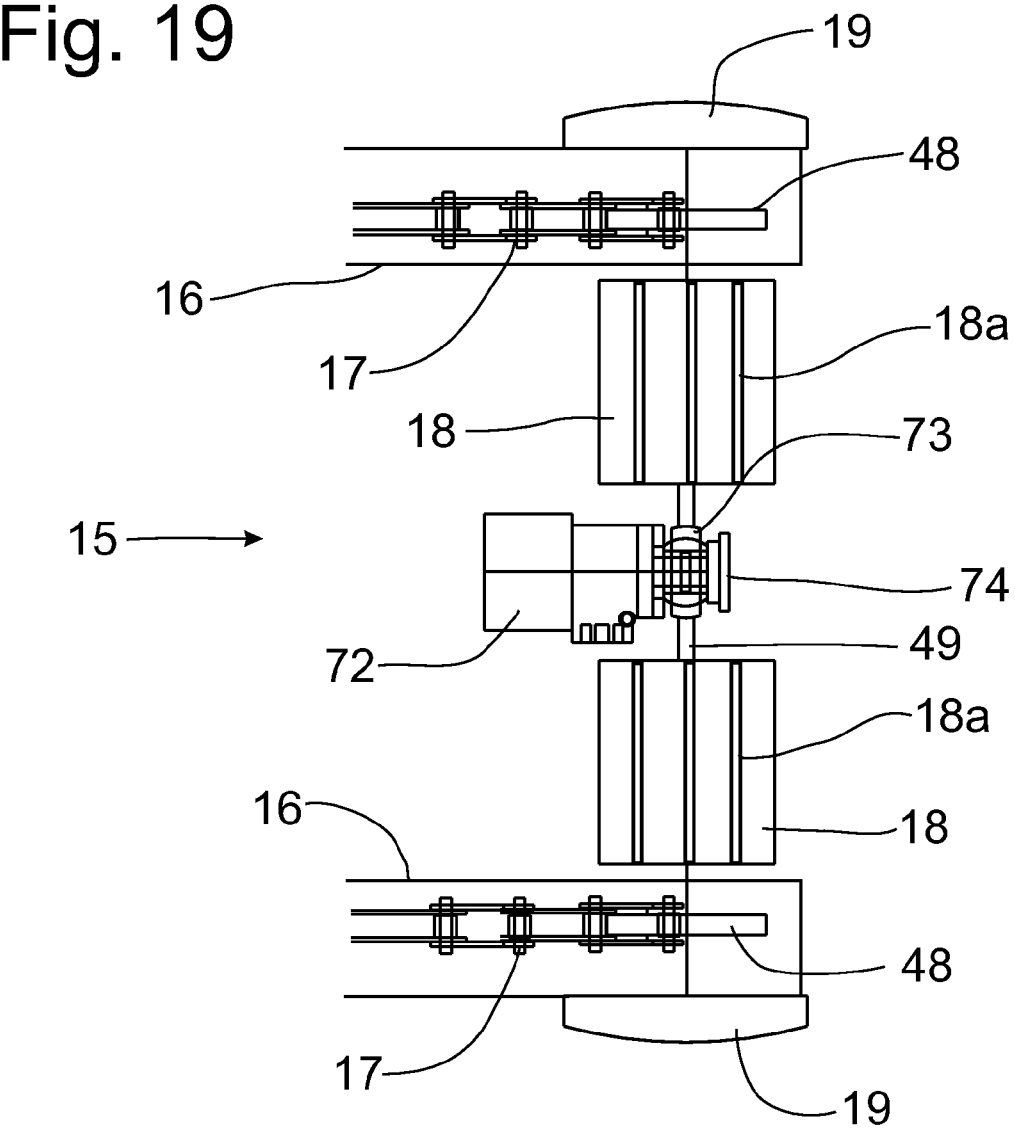
FIG. 19 is an enlarged partial top plan view of the rear portion of the transporter bed showing the starter roll and the drive coupling for the wrapper apparatus.
Figure 20:
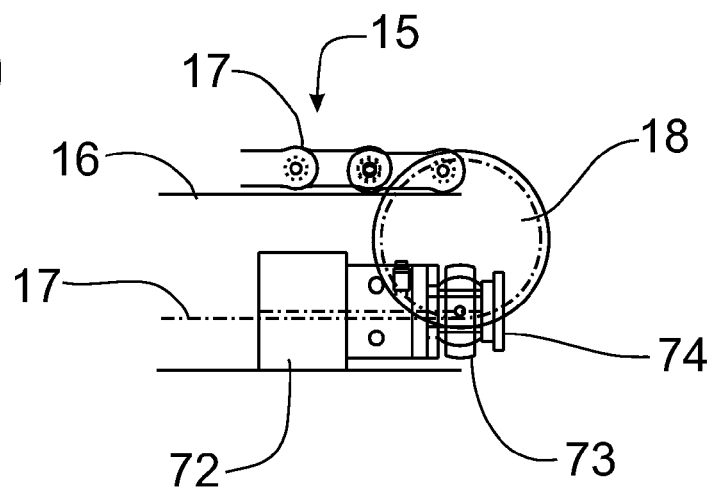
FIG. 20 is an enlarged partial left side elevational view of the rear portion of the transporter bed corresponding to FIG. 19, a portion of the starter roll being broken away to provide a better view of the drive coupling.
Figure 21:
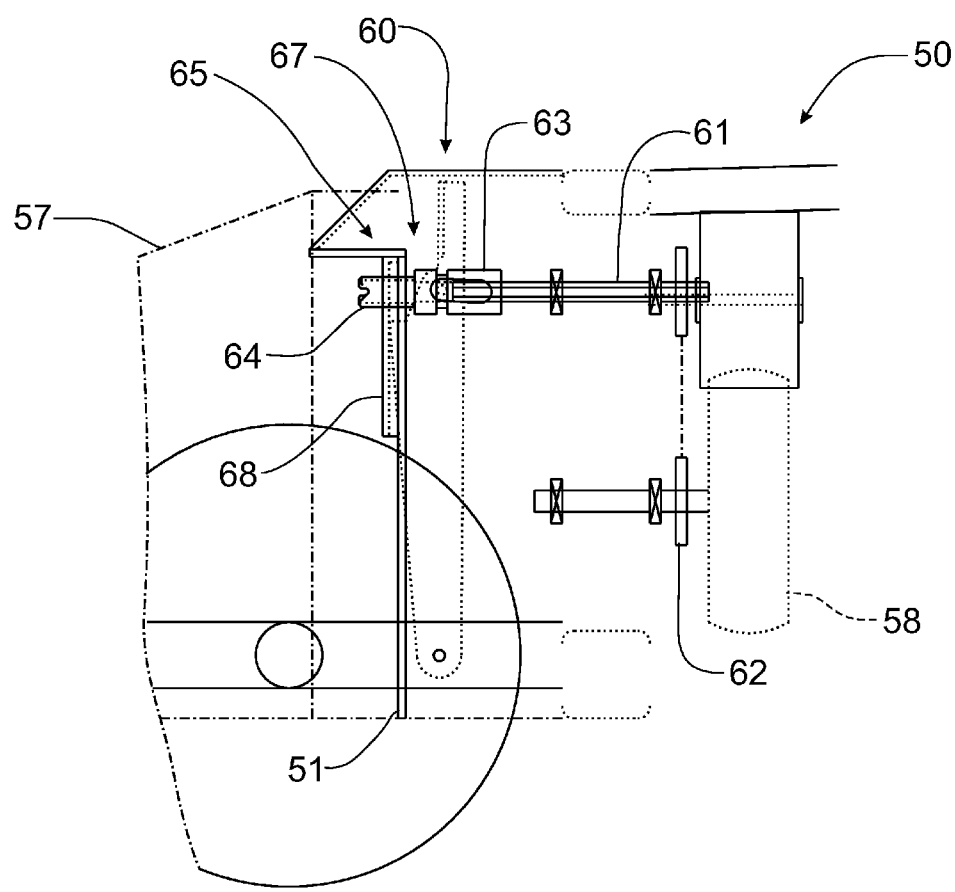
FIG. 21 is an enlarged partial side elevational of a forward portion of the wrapper apparatus showing the drive mechanism for connection to the drive coupling on the rear portion of the transporter.
Figure 22:
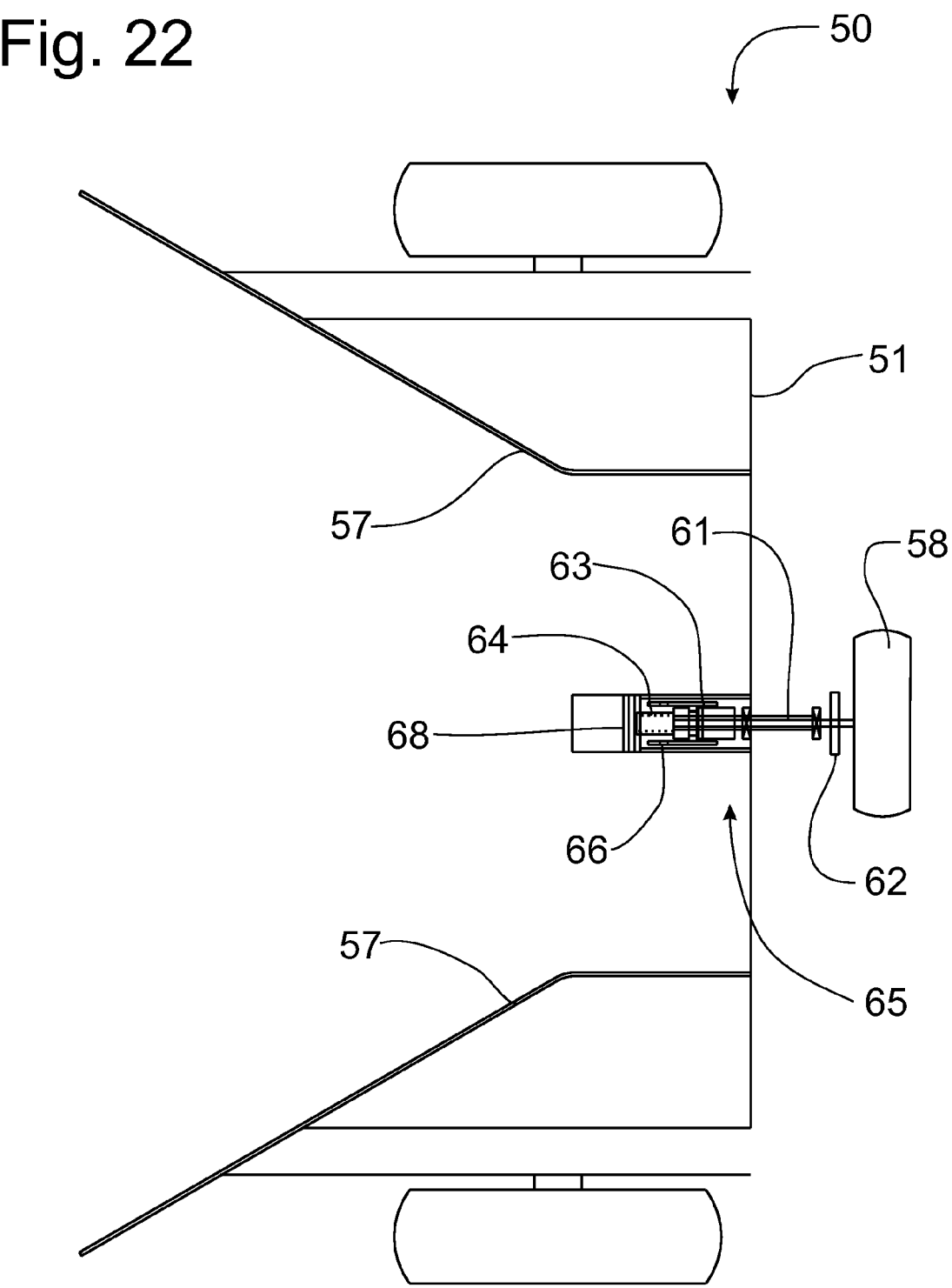
FIG. 22 is a partial top plan view of the forward portion of the wrapper apparatus shown in FIG. 21.
Figure 23:
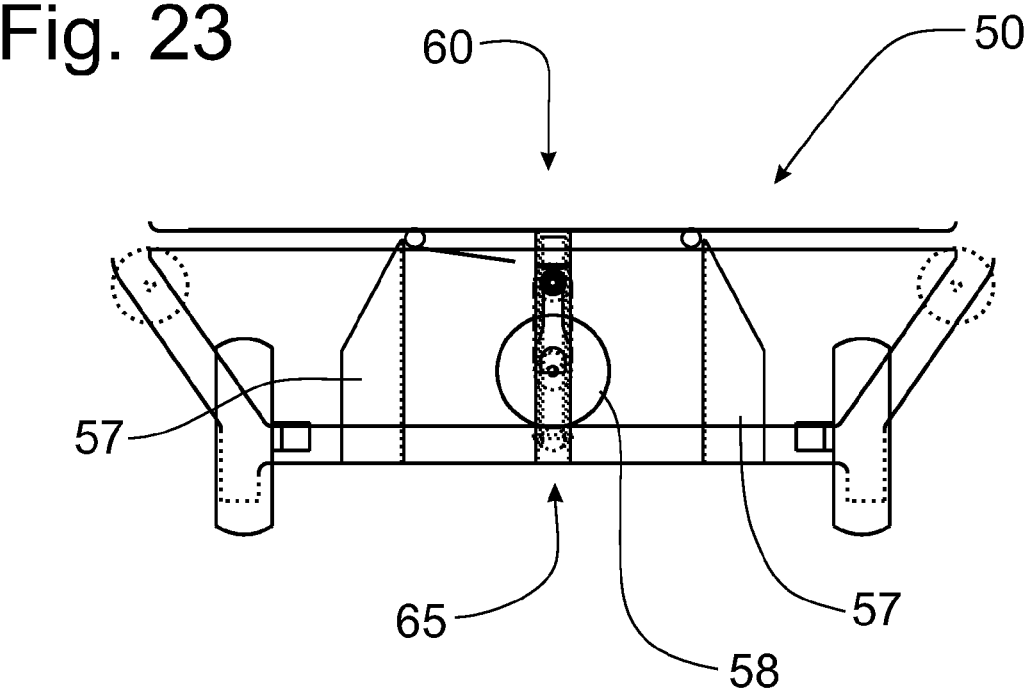
FIG. 23 is a partial front elevational view of the front portion of the drive mechanism on the wrapper apparatus.
Figure 24:
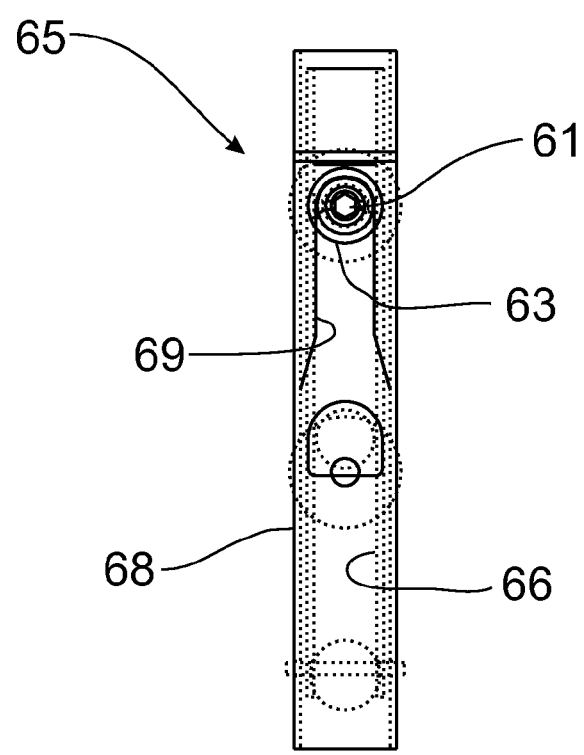
FIG. 24 is an enlarged detail view showing a front elevational view of the connecting mechanism forming a part of the drive mechanism at the forward end of the wrapper apparatus.

Preferably, the drive apparatus 70 is in the form of a hydraulic motor 72 operatively connected to the hydraulic valve 43 to receive hydraulic fluid under pressure therefrom. As best seen in FIGS. 19 and 20, the hydraulic motor 72 is supported from the rear driven shaft 49 by a spherical mount 73 that allows the hydraulic motor 72 to swivel relative to the transporter bed 15. The rearward end of the hydraulic motor 72 is equipped with a receiving cup 74 that projects rearwardly from the spherical mount 73 and is movable with the hydraulic motor 72 about any axis passing through the spherical mount 73.

Referring now to FIGS. 21-24, the connection mechanism 65 includes a slidable coupler 63 mounted on the forward end of the drive input shaft 61. The slidable coupler 63 includes a drive member 64 at the forward end thereof that is configured to mate with the hydraulic motor 72 to receive rotational power therefrom. The slidable coupler 63 is movable along the drive input shaft 61 and is engaged with a pivoted actuator link 66 that is operable to move the slidable coupler 63 along the input shaft 61. The actuator link 66 is biased to keep the slidable coupler 63 moved forwardly along the input shaft 61 for engagement with the hydraulic motor 72. The actuator link 66 is pivotable into a vertically oriented receiving channel 68 into which the drive member 64 of the slidable coupler 63 projects when the actuator link 66 is located in the receiving channel 68.

The receiving channel 68 is formed with a return that defines a vertically oriented slot 69 that is open at the bottom and closed at the top above the slidable coupler 63. The slot 69 is configured to receive the receiving cup 74 which is guided by the slot 69 to the top of the slot 69 where the receiving cup 74 is in alignment with the drive member 64 of the slidable coupling 63. When the receiving cup 74 engages the receiving channel 68, the receiving cup 74 pushes against the actuator link 66 and causes the actuator link 66 to pivot rearwardly and slide the coupling 63 rearwardly on the input shaft 61 out of engagement with the receiving channel 68. The actuator link 66 is formed with an offset relief 67 at the upper portion thereof, which is sized to allow the actuator link 66 to pivot forwardly into the receiving channel 68 when the receiving cup 74 is at the top of the slot 69 in alignment with the offset relief 67.

This forward movement of the actuator link 66 moves the slidable coupling 63 through the receiving cup 74 into engagement with the hydraulic motor 72 for a driving connection therewith. Accordingly, the operation of the wrapper apparatus 50 receives operative power from the hydraulic system 90 of the transporter 10. Furthermore, the positioning of the receiving cup 74 at the top of the receiving channel 68 physically couples the wrapping apparatus 50 to the transporter 10 so that the wrapping apparatus 50 moves with the transporter 10 during the wrapping operation, as described in greater detail below. The offset in the actuator link 66 restricts the receiver cup 74 from vertical movement within the receiver channel 68. The shape of the offset relief 67 defines a cam surface against which the receiver cup 74 can press when the rearward end of the transporter 10 is lowered. The cam surface on the offset relief 67 pushes the actuator link 66 rearwardly to retract the sliding coupling 63 from engagement with the hydraulic motor 72 and the receiving cup 74 so that the receiving cup 74 can move out of the slot 69 and disengage the wrapper apparatus 50 from the transporter 10.

Figure 33:
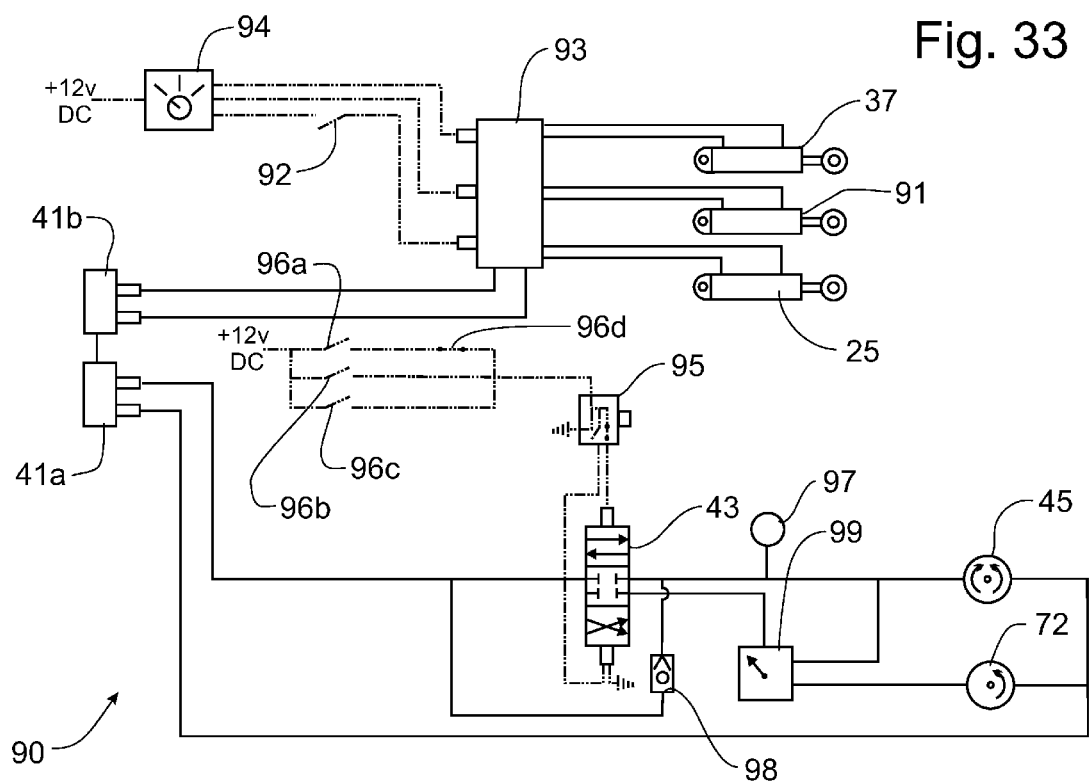
FIG. 33 is a schematic diagram of the electrical and hydraulic systems for the transporter.

As is best seen in FIG. 33, the hydraulic system 90 of the transporter 10 is detachably connectable to the hydraulic ports 41 of the tractor T to obtain a source of hydraulic fluid under pressure. Preferably, the hydraulic system 90 is connected to two sets of hydraulic ports 41a, 41b to permit effective operation of the transporter 10 and wrapper apparatus 50. The hydraulic fluid under pressure is directed from the two hydraulic ports 41a, 41b into the hydraulic valves 43, 93 that re-direct the hydraulic fluid to multiple hydraulic devices. Preferably, one hydraulic port 41a directs hydraulic fluid to the hydraulic motors 45, 72 through the valve 43, which is normally controlled through the pressure activated switch 95 in conjunction with the sensor switches 96a-d to direct hydraulic fluid to the transporter drive motor 45 and to the wrapper drive motor 72.

The electrical system shown in FIG. 33 includes a first switch 96a that indicates when a bale is present in the first position (where the lift mechanism 20 deposits a bale on the transporter bed 15), a second switch 96b that is closed when the wrapper apparatus 50 is hooked to the transporter 10, and a third switch 96c that is closed when the axle assembly 30 is lowered. A fourth switch 96d is normally closed, but is opened when a bale has reached the end position on the transporter bed 15, thus indicating that the transporter is full. The pressure activated switch 95 is electrically operated in conjunction with the switches 96a-d to control the positioning of the valve 43. The pressure activated switch 95 has one switch that is normally closed to move the valve 43 to direct hydraulic fluid to the motor 45 to operate the conveyor chains 17 rearwardly, and a second switch that is normally open.

When the pressure activated switch 95 senses sufficient pressure within the hydraulic system 90, the position of the switches changes to move the valve 43 to direct hydraulic fluid to the flow divider 99. Accordingly, when the bales are being pushed through the wrapper apparatus 50 and hydraulic pressure increases, the pressure activated switch 95 senses the increased pressure and moves the valve to direct hydraulic fluid to the flow divider 99 to operate the wrapper apparatus 50. This movement of the valve 43 directs hydraulic fluid to a proportional flow divider 99 that is adjustable to vary the proportions of the flow of hydraulic fluid between the two hydraulic motors 45, 72. This adjustability allows the operator to define the number of wraps of plastic affected by the motor 72 for each increment of movement of the bales affected by the motor 45.

The hydraulic system 90 is arranged to direct flow of hydraulic fluid through the motor 45 to operate the conveyor chain 17 rearwardly only when certain conditions are met, as represented by the switches 96a-d. However, the check valve 98 allows a forward operation of the conveyor chains 17 at any time, irrespective of the position of the switches 96a-d, by allowing a reverse flow through the motor 45 which bypasses the valve 43. With respect to switches 96a, 96d, the conveyor 17 can be operated rearwardly when a bale is in the first position, unless the transporter 10 is full, which opens switch 96d. When the wrapper apparatus 50 is connected to the transporter 10, the conveyor 17 can be operated rearwardly, irrespective of whether switches 96a, 96d are open or closed, so that the bales can be moved to the wrapper apparatus 50. When the axle assembly 30 is lowered to drop the rearward end of the transporter bed 15 toward the ground, the conveyor can be operated rearwardly to be able to discharge the wrapper apparatus 50 that is carried on the transporter bed 15.

The second tractor hydraulic port 41b is connected directly to a three position solenoid valve 93 that selectively directs hydraulic fluid to the hydraulic cylinders on the transporter 10, including the hydraulic cylinders 37 for lowering the axle assembly 30, the hydraulic cylinder 91 for activating the push gate 14, and the hydraulic cylinder 25 for operating the pick-up mechanism 20. The solenoid valve 93 is electrically powered and connected to a three position switch 94 located in the tractor cab. By selecting one of the three alternate positions on the switch 94, the operator can selectively direct flow of hydraulic fluid from the solenoid valve 93 to the desired hydraulic cylinder 25, 37 or 91. Preferably, the electrical circuit between the three-position switch 94 and the solenoid valve 93 corresponding to the control of the lift cylinder 25 has a switch 92 incorporated therein to be normally open but is closed when the push gate 14 is in the forward home position. This switch 92 prevents the lift mechanism 20 from being accidentally operated to load a bale onto the transporter 10 when the push gate 14 is in operation.

The pick-up mechanism 20 does not need to operate at the same time as either the hydraulic cylinders 37 for the axle assembly 30 or the hydraulic motor 72 to drive the wrapper apparatus 50. Accordingly, the hydraulic valve 43 is operable to allow the operator to select which of these three hydraulic devices, the cylinders 25, the cylinders 37 or the hydraulic motor 72, to operate with the second hydraulic port 41. Accordingly, the operation of the hydraulic motor 45 and a selected one of the other three hydraulic devices 25, 37 and 72 can be controlled through the hydraulic controls within the tractor T.

Referring now to FIGS. 25-30, a large rectangular bale cam orientation mechanism 80 supported on the pick-up mechanism 20 can best be seen. The cam orientation mechanism 80 includes a lift member 82 extending transversely from a cam follower 83, spanning most of the distance between the tines 23. The cam follower 83 is mounted in a cam track 85 that is angled rearwardly and upwardly along the outside periphery of the pick-up mechanism 20 in vertical alignment with the outermost tine 23. The lift member 82 is formed with forwardly extending prongs 84 that are oriented to extend into a large rectangular bale when engaged therewith. The prongs 84 can be loosened from their engagement with the bale by indexing the bale forwardly along the transporter bed and easily retracted from the bale, particularly if the prongs 84 are movable relative to the lift member 82.

In operation, the pick-up mechanism 20 is aligned with a large rectangular bale R to be placed onto the transporter bed 15 such that the bale R is oriented between the transversely spaced tines 23. The pick-up mechanism 20 is moved forwardly into engagement with the bale R so that the lift member 82 engages the face of the bale R with the prongs projecting into the bale R, as depicted in FIG. 26. Continued advancement of the pick-up mechanism 20 into the rectangular bale R causes the cam follower 83 to move upwardly along the cam track 85, as is shown sequentially in FIGS. 27 and 28 until the rectangular bale R is elevated into a vertical position as is depicted in FIG. 29. The hydraulic cylinder 25 can then be operated to affect a pivotal movement of the subframe 22 of the pick-up mechanism 20 to load the large rectangular bale R onto the transporter bed 15, as is demonstrated in FIG. 30.

Figure 15:
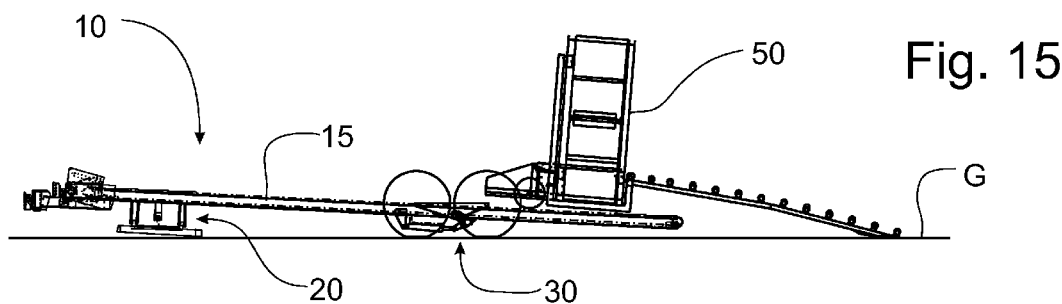
FIG. 15 is a left side elevational view of the transporter similar to that of FIG. 14, but showing the wrapper apparatus being pulled further on-board the transporter bed in a loading operation.

Since the wrapper apparatus 50 has no on-board power generating devices, the wrapper mechanism 50 must be transported to the job site. The conventional manner of getting the wrapper apparatus 50 to the field to wrap bales of forage crop is to attach the wrapper apparatus to a second tractor or a pick-up truck that will tow the wrapper apparatus from place to place. This conventional manner of bringing the wrapper apparatus to the job site requires an additional source of motive power and another person to operate that machine. The transporter 10, as can be seen in FIGS. 13-15, is operable to load the wrapper apparatus 50 onto the transporter bed 15 for transportation from one location to another.

The fully loaded wrapper apparatus 50 is shown in FIG. 13 in the orientation in which the transporter 10 carries the wrapper apparatus 50 to the job site where the wrapper apparatus 50 is unloaded at the site desired for storage or wrapped bales, and then the transporter 10 is free to move about the field collecting bales of forage crop. Loading the wrapper apparatus 50 onto the transporter bed 15 starts with a lowering of the rearwardmost portion of the transporter bed 15 to the ground G, as is described in detail above through manipulation of the hydraulic cylinders 37. The transporter conveyor 17 is then connected to the wrapper frame 51 by simultaneously operating the conveyor 17 in a forward direction and backing the transporter 10 under the wrapper apparatus 50 until projections (not shown) on the wrapper frame 51 engage the conveyor chain 17. Once engaged, the rearward movement of the transporter 10 ceases and the conveyor 17 draws the wrapper apparatus 50 onto the transporter bed 15, as is reflected in FIG. 14. The continued forward movement of the conveyor chains 17, as is depicted in FIG. 15, brings the wrapper apparatus 50 along the transporter bed 15 until fully loaded, as is shown in FIG. 13. The transporter bed 15 is then raised to the normal generally horizontal operative position and then the transporter 10 can carry the wrapper apparatus 50 to the desired bale storage area.

Unloading the wrapper apparatus 50 is simply done the opposite way by lowering the rearwardmost end of the transporter bed 15 to the ground G and then moving the conveyor chains 17 rearwardly until the wrapper apparatus 50 is discharged off the transporter bed 15. One skilled in the art will recognize that the transporter 10 should be moved forwardly as the wrapper apparatus 50 engages the ground behind the transporter 10 as the wrapper apparatus 50 has no wheeled support. The projections (not shown) on the wrapper apparatus 50 that are engaged with the conveyor chain 17 are pushed out of engagement with the conveyor chain 17 as the projections pass over the rear sprockets 18. Thus, the wrapper apparatus 50 can be discharged off the rearward end of the transporter bed 15 for operation to wrap bales in plastic as described in detail below.

Figure 17:
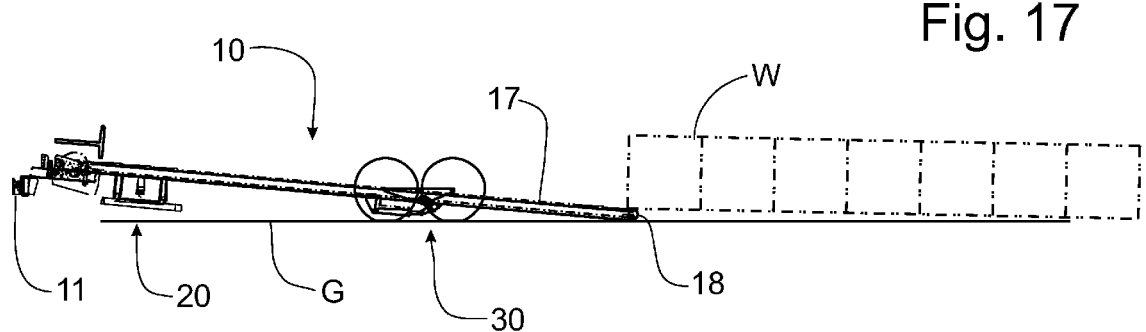
FIG. 17 is a left side elevational view of the transporter similar to that of FIG. 14 but showing the line of wrapped bales being started in the loading operation.
Figure 18:
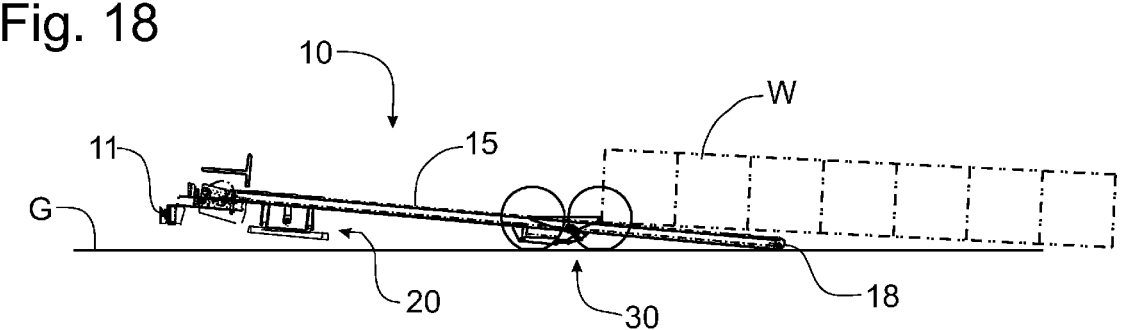
FIG. 18 is a left side elevational view of the transporter similar to that of FIG. 17 but showing the line of bales being moved forwardly along the transporter bed.

The transporter 10 can also be used to retrieve wrapper bales W from their storage position on top of the ground G. As is reflected in FIG. 17, the rearwardmost end of the transporter 10 is lowered to the ground G and the conveyor chains 17 operated to pull loads forwardly on top of the transporter bed 15. The roller 18, being rotated with the conveyor chains 17, digs underneath the front wrapped bale W with the aggressive ribs 18a, and starts the elevation of the wrapped bales W onto the end of the tilted transporter bed 15. Once started, the conveyors 17 are rather easily able to pull the line of wrapped bales W onto the transporter bed 15, at least partially because the entire line of wrapped bales W are connected through the spirally wrapped plastic. One skilled in the art will recognize that the loading of the wrapped bales W onto the transporter bed 15 would be facilitated by the rearward movement of the entire transporter 10 as the bales W are moving onto the transporter bed 15, as is reflected in FIGS. 16 and 18.

In operation, the transporter 10 carries the wrapper apparatus 50 on top of the transporter bed 15 to the job site where the wrapped bales are intended to be stored. The wrapper apparatus 50 is then unloaded from the transporter bed 15 and positioned for subsequent operation. The transporter 10 is then free to move about the field collecting large round or rectangular bales of forage crop. As is described above, each bale B, R is engaged with the pick-up mechanism 20 and then elevated onto the transporter bed 15. Once placed on the transporter bed 15 opposite the pick-up mechanism 20, the hydraulic motor 45 is operated to drive the conveyor chains 17 to index the bale B, R rearwardly one bale length. The next bale B, R is then collected and elevated onto the transporter bed 15 adjacent the first bale. Then the conveyor chains 17 are operated again to advance the collected bales rearwardly one bale length. This process is repeated until the entire transporter bed 15 is loaded with collected bales B, R.

The loaded transporter 10 is then driven by the tractor T to the wrapper apparatus 50. The rearwardmost end of the transporter 10 is then lowered by operation of the hydraulic cylinders 37 to approximately six inches above the ground G and then the transporter 10 is backed toward the center of the wrapper apparatus 50 until contact is made. Guides 57 on the wrapper apparatus 50 engagable with spherical end caps 19 formed on the transporter bed 15 outboard of the rear roller 18, best seen in FIG. 19, aligns the wrapper apparatus 50 into the proper side to side orientation, at which point the receiving cup 74 is generally aligned with the receiver channel 68, but positioned below the vertical slot 69. As the transporter 10 is backed closer to the wrapper apparatus 50, the receiving cup 74 touches a flat surface immediately below the vertical slot 69. Since the receiving cup 74 and hydraulic motor 72 can pivot about any axis due to the spherical mount 73, the receiving cup 74 is squared into angular alignment with the input shaft 61 irrespective of the orientation of the transporter 10 with the wrapper apparatus 50.

With the wrapper apparatus 50 aligned in a side to side orientation and the receiving cup 74 square to the input shaft 61 of the wrapper apparatus 50, the transporter bed 15 is raised through manipulation of the hydraulic cylinders 37 to move the receiving cup 74 into the vertical slot 69 until reaching the top of the slot 69, which aligns the hydraulic motor 72 on the transporter 10 with the input drive shaft 61 of the wrapper apparatus 50. The raising of the transporter bed 15 also attaches the frame 51 of the wrapper apparatus 50 to the transporter bed 15 through connection of the receiver cup 74 trapped at the top of the receiver channel 68. Once connected, the forward movement of the transporter 10 will result in a corresponding forward movement of the wrapper apparatus 50. The positioning of the receiver cup 74 at the top of the receiver channel 68 allows the forwardly biased actuator link 66 to slide the coupler 63 on the input shaft 61 through the receiver cup 74 and connect the input shaft 61 to the hydraulic motor 72.

Figure 47:
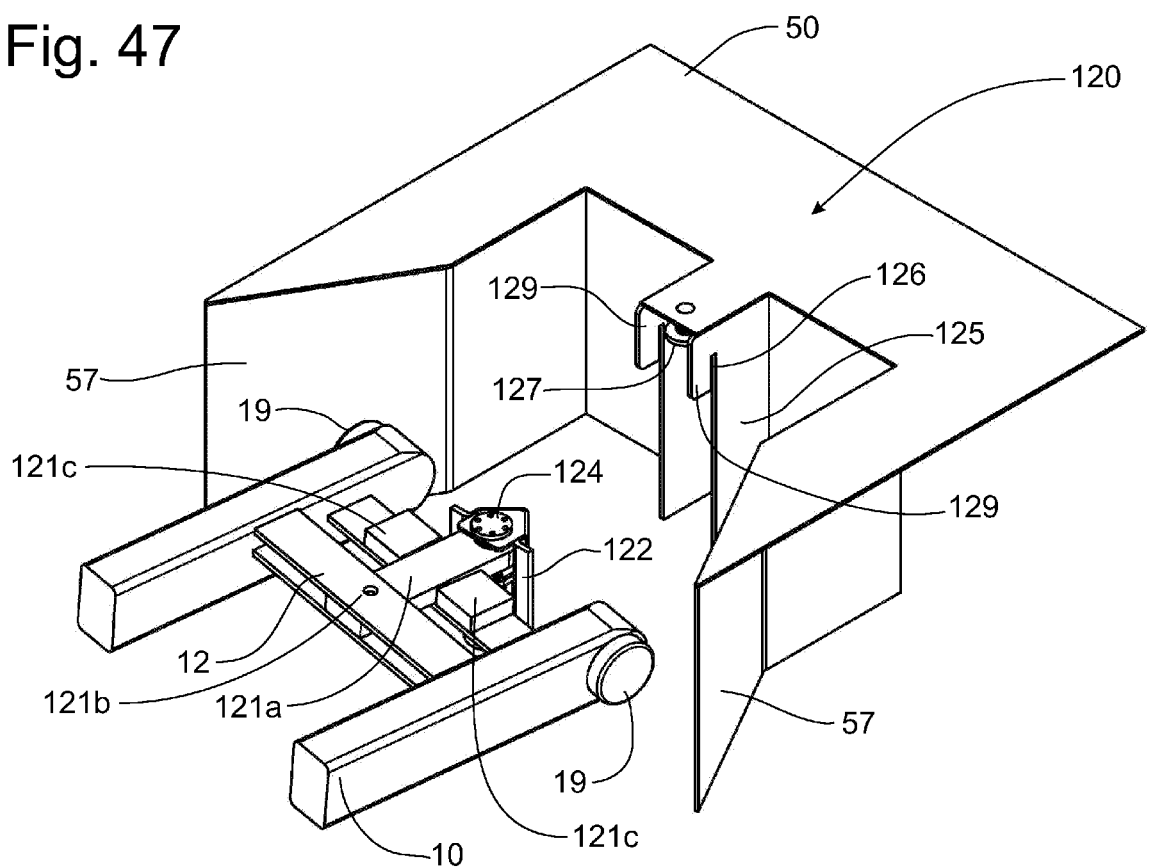
FIG. 47 is a schematic perspective view of the rearward end of the transporter approaching the frame of the wrapper apparatus, utilizing an alternative connection arrangement that is vertically oriented.
Figure 48:
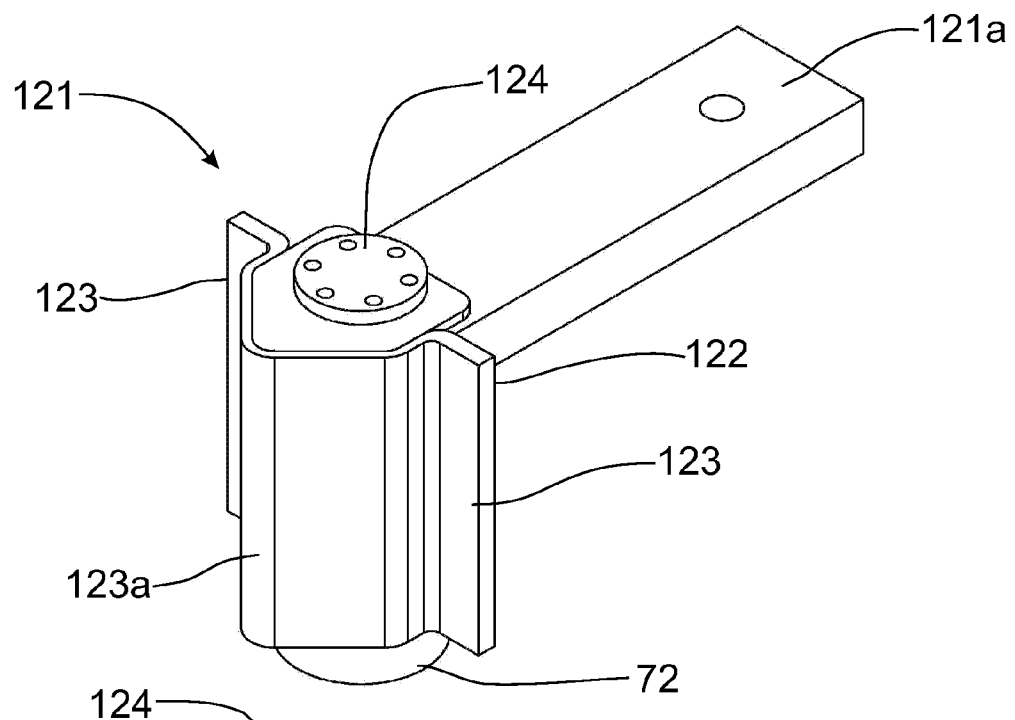
FIG. 48 is a schematic perspective detail view of the alignment apparatus on the rearward end of the transporter used in the alternative connection arrangement shown in FIG. 47.
Figure 49:
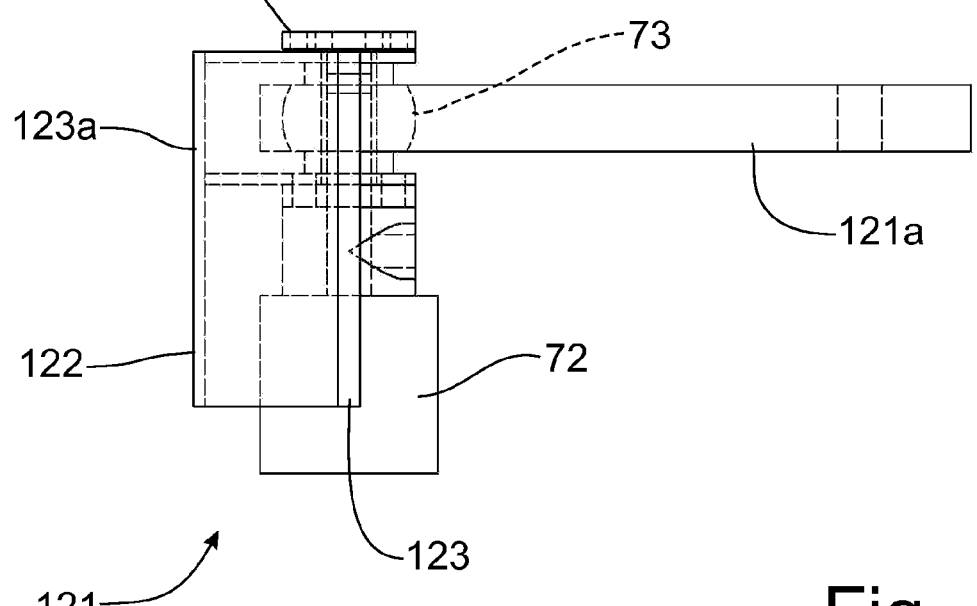
FIG. 49 is a schematic side elevational view of the alignment apparatus shown in FIG. 48.

Referring now to FIGS. 47-51, an alternative connection arrangement 120 between the rearward end of the transporter 10 and the wrapper apparatus 50 can be seen. The alignment apparatus 121 at the rearward end of the transporter 10 is best seen in FIGS. 48 and 49 and includes the hydraulic motor 72 oriented in a vertical manner, instead of the horizontal orientation depicted in FIGS. 19 and 20. A swivel mount 73 is again provided to accommodate misalignments in the transporter 10 relative to the wrapper apparatus 50. This swivel mount 73 can be constructed in a number of different configurations, including a spherical or ball joint, or a mechanism that allows pivotal movement about three mutually perpendicular pivot axes. The important aspect of the swivel mount 73 is that the connection defined by the swivel mount 73 is able to pitch, yaw and roll, but not translate.

In the alternative connection arrangement 120, the swivel joint 73 is a spherical joint supported in the pivot arm 121a that is pivotally connected to the frame 12 of the transporter 10 for a limited amount of pivotal movement in a generally horizontal direction about a vertical pivot axis 121b. Stop blocks 121c are mounted on the frame 12 on opposing sides of the pivot arm 121a to limit the lateral movement of the pivot arm 121a. The limited lateral movement afforded to the swivel mount 73 by the pivot arm 121a allows the swivel mount 73 to better align against the connection bracket 125, as will be described in greater detail below, to accommodate for manufacturing tolerances and damages to the components. The swivel mount 73 supports a connection plate 122 to be movable relative to the transporter 10. Preferably, the connection plate 122 is formed in a vertically oriented hat-shape with a pair of flanges 123 projecting laterally from the central arched portion 123a. The hydraulic motor 72 is also mounted from the swivel joint 73 and is movable with the connection plate 122. The hydraulic motor 72 has a drive shaft that terminates in a horizontally disposed drive cog 124 that is exposed at the top of the connection arrangement 120. The drive cog 124 is formed with a plurality of circumferentially spaced openings or notches.

Figures 50, 51:
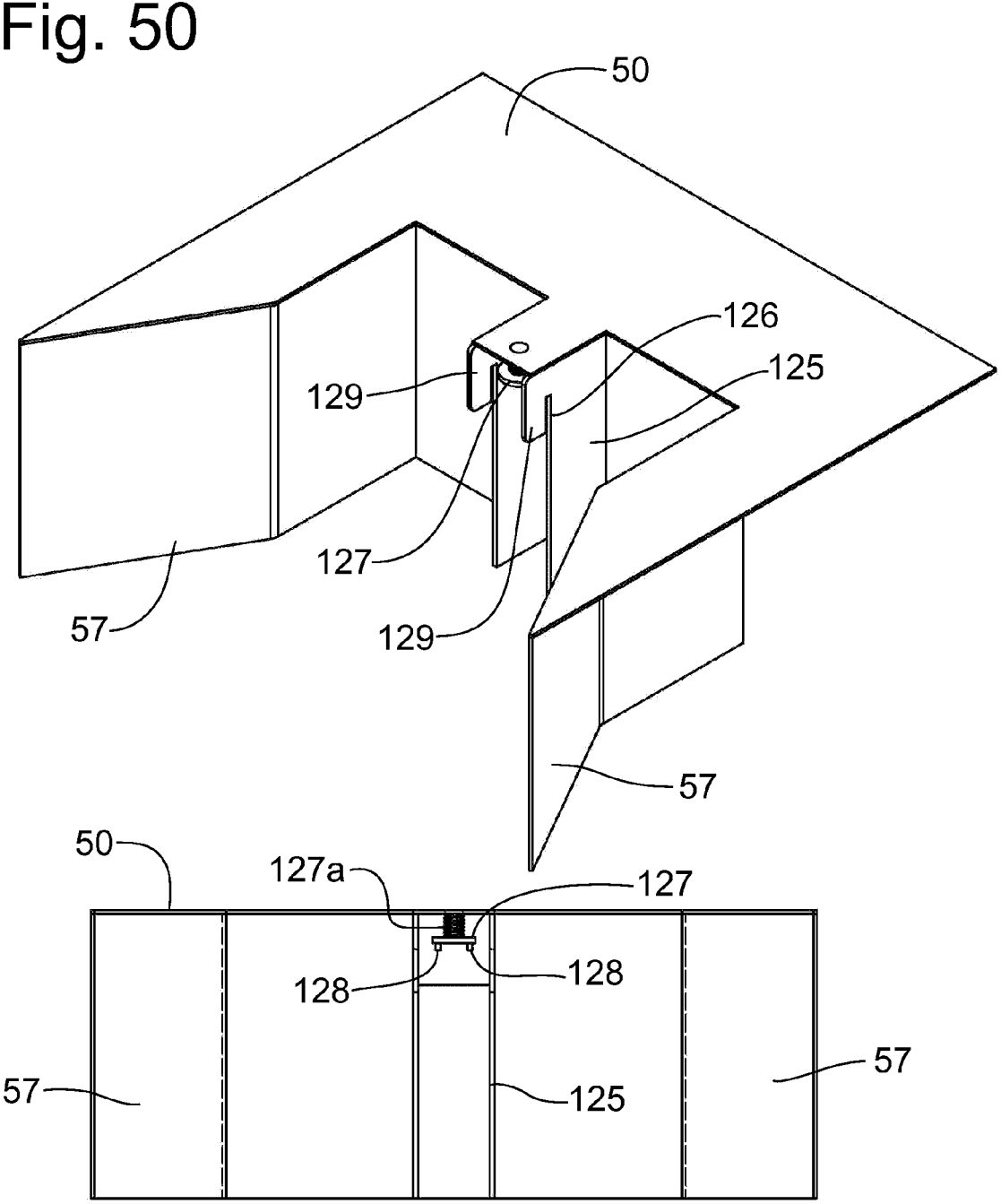
FIG. 50 is a schematic perspective view of the wrapper portion of the alternative connection arrangement shown in FIG. 47.
FIG. 51 is a schematic front elevational view of the apparatus shown in FIG. 50.

Referring now to FIGS. 50 and 51, the wrapper apparatus 50 is formed with a connection bracket 125 that is formed with downwardly opening slots 126 on opposing sides of the bracket 125. The top of the generally U-shaped connection bracket 125 has mounted on the underside thereof a driven sprocket 127 with a chain entrained thereon. The chain operatively connects to the drive mechanism on the wrapper 50, such as the wrapping mechanism 56. The sprocket 127 is spring-loaded downwardly by the spring 127a, but is movable in an upward direction a slight distance to accommodate misalignments, as will be discussed in greater detail below. A pair of diametrically opposed drive pins 128 project downwardly from the driven sprocket 127 and are sized to fit within the openings or notches in the drive cog 124.

Figure 54:
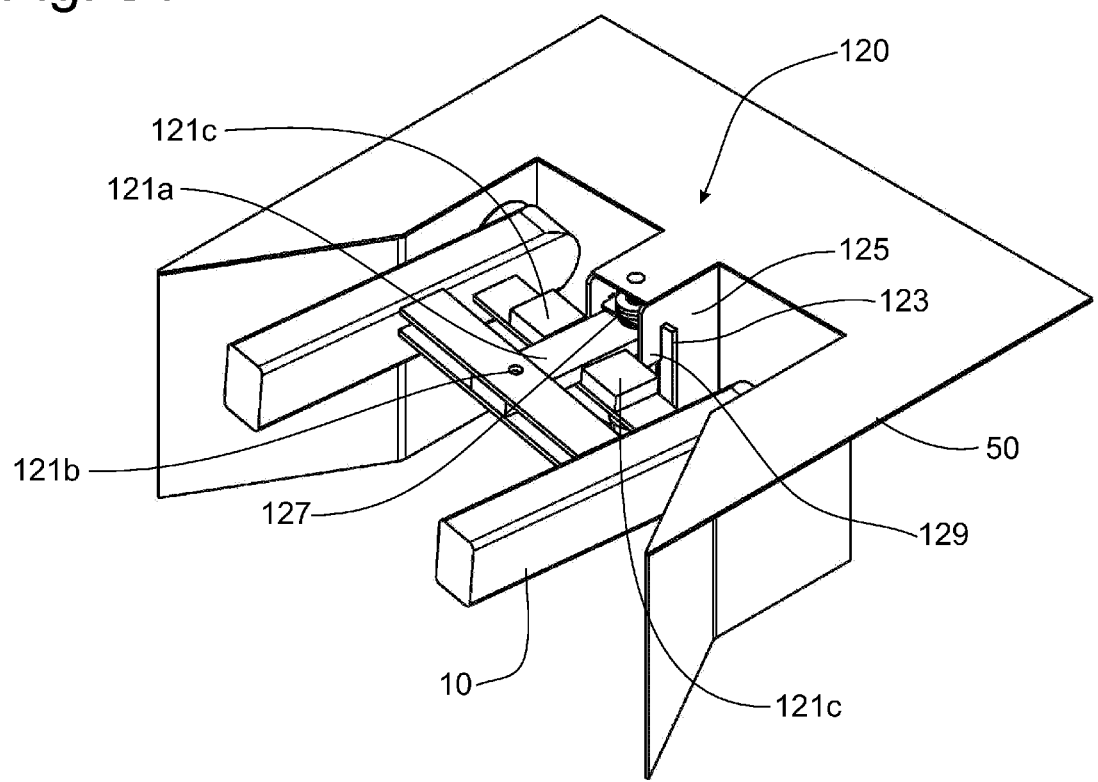
FIG. 54 is a schematic perspective view of the alternative connection arrangement shown in FIG. 47, but depicting the rearward end of the transporter connected to the wrapper apparatus even though the rearward end of the transporter is misaligned with the wrapper apparatus.

The operation of the alternative connection arrangement 120 is best seen in FIGS. 47, 52 and 53, the transporter 10 needs only to be generally aligned, both horizontally and vertically, with the wrapper apparatus 50, as is depicted in FIGS. 47, 52 and 53 and described above, as the guides 57 will direct the rearward end of the transporter 10 into alignment with the wrapper apparatus 50. The swivel mount 73 allows the connection plate 122 to move in a pivotal manner when the connection plate 122 engages the connection bracket 125 as the rearward end of the transporter 10 backs into the wrapper apparatus 50. Because of the swivel movement of the connection plate 122, the connection plate 122 will align perfectly with the connection bracket 125 with the flanges 123 being engaged against the connection bracket 125. A subsequent upward movement of the rearward end of the transporter 10, such as through the operation of the axle assembly 30 described above, moves the flanges 123 of the connection plate 122 upwardly into the downwardly opened slot 126, as is shown in FIG. 54, to interconnect the connection plate 122 with the connection bracket 125. The hooks 129 which define the downwardly opened slot 126 are configured to be aligned vertically and horizontally with the swivel mount 73 so that there is little or no torque applied to the swivel mount 73 when the transporter 10 is pulling the wrapper apparatus 50 behind it during the wrapping operation.

This upward movement of the rearward end of the transporter 10 also pushes the drive cog 124 into engagement with the driven sprocket 127. Assuming that the drive pins 128 are not in perfect alignment with the notches in the drive cog 124, the drive cog 124 will push upwardly against the driven sprocket 127 and compress the spring 127a biasing the driven sprocket 127 downwardly and push the driven sprocket 127 up against the top of the connection bracket 125. Once the drive cog 124 is rotated by the hydraulic motor 72, the openings or notches will become aligned with the drive pins 128, which will drop into engagement with the openings or notches to drivingly connect the drive cog 124 and the driven sprocket 127, and allow the driven sprocket 127 to move downwardly as induced by the spring load from the compressed spring 127a.

Disengaging the transporter 10 from the wrapper apparatus 50 is accomplished simply by lowering the rearward end of the transporter 10 which drops the connection plate 122 out of the slot 126 and disengages the drive cog 124 from the driven sprocket 127. Once clear of the connection bracket 125, the transporter 10 is free to pull away from the wrapper apparatus 50 to go collect another load of large bales for continued wrapping by the wrapper apparatus 50.

One skilled in the art will recognize that the above-described swivel mount 73 is not limited to use in conjunction with the connection of a bale wrapper 50 to a transporter 10, or even to the utilization of the swivel mount 73 at the rearward end of the transporter 10. More particularly, the use on one implement of a connector plate 122 rotatable about a single point to allow alignment with a connection mechanism 125 on a second implement has widespread use. For example, the mounting of the swivel mount 73 on the lower lift links of a tractor would allow the tractor to back up to any implement equipped with a corresponding connection mechanism 125 and hook up to the implement without the operator having to leave the tractor.

Furthermore, the hydraulic motor 72, or other rotatable power source, does not have to be aligned with the axis of the swivel mount 73 as the power source can be offset from the swivel mount 73 so long as the rotatable power source is supported from the connector plate 122 so that the rotatable power source is properly positioned for engagement with the driven apparatus on the implement being connected to provide automatic coupling of the drive from the first implement to the second implement. The drive connection could be with hydraulic couplers on the first and second implements to connect a hydraulic system on the first implement to the hydraulic system on the second implement.

The automatic coupling of hydraulic systems could be of particular importance when the swivel mount 73 is utilized on a tractor lower lift links. In such an arrangement, the lower lift links on the tractor can be lowered to drop the connector plate 122 below the level of the connection to the connection mechanism 125 so that the connector plate 122 will align against the connection mechanism 125 of the implement irrespective of the alignment of the implement to the tractor, whereupon the raising of the lower lift links would engage the connector plate 122 into the connection mechanism 125, and if properly equipped, automatically connect hydraulic systems of drive mechanisms between the tractor and the implement being connected.

The push gate 14 is selectively connected to the conveyor chains 17 to help move bales from the transporter bed 15 into the wrapper apparatus 50. The push gate 14 is normally supported on the frame 12 of the transporter 10 above the drive mechanism 40 at the forward portion of the transporter 10, but when needed, the push gate 14 can be connected to the conveyor chains 17 and help push the bales off the rear of the transporter bed 15. Once the transporter 10 has been properly coupled with the wrapper apparatus 50, the push gate 14 is connected to the conveyor chains 17 and the push gate 14 and conveyor chains 17 are driven rearwardly to move the bales that had been loaded on the transporter bed 15 toward the wrapper apparatus 50.

When the rearmost bale on the transporter bed 15 enters the wrapper apparatus 50, the pressure in the hydraulic system 90 increases, due to the load encountered to push the rearwardmost bale through the wrapper apparatus 50, which causes the pressure activated switch 95 to move the valve 43 and direct fluid to the flow divider 99 for operating the motors 45 and 72 simultaneously in the proportions selected. Since the hydraulic motor 72 is connected to the wrapper driveline, the wrapper hoop 55 will rotate to apply stretch film in a continuous spiral to the outer surface of the bales. The adjustability of the flow divider 99 selects the proportions of the flow of hydraulic fluid distributed to motors 45, 72, and thus, the operator can easily vary the relative speeds of these motors 45, 72 to place more or fewer wraps of plastic on the bales being wrapped as desired.

The operator continues to move the conveyor chains 17 rearwardly to push the bales through the wrapper hoop 55 and down the wrapper ramp 52. When the wrapped bales are discharged off the rearward end of the inclined wrapper ramp 52, friction with the ground G keeps the bales from moving any further from the wrapper apparatus 50. Therefore, as the conveyor chains 17 try to move bales rearwardly into the wrapper hoop 55, the push gate 14 cannot move the bales with respect to the ground G. To continue with the wrapping operation, the entire transporter 10 (along with tractor T) is pushed forwardly against the bales being wrapped. Since the wrapper apparatus 50 is connected to the transporter bed 15, the wrapper apparatus 50 is pulled along with the transporter 10, which effectively pulls the wrapper apparatus 50 along the line of bales to be wrapped until the forwardmost bale on the transporter bed 15 is within the wrapper hoop 55.

A pressure gauge 97 in the transporter hydraulic system 90 informs the operator of the force being applied to the row of bales as the bales are being wrapped. The operator can manipulate the force applied to the bales by applying or releasing the brakes of the tractor T as needed, which in turn keeps gaps from being between the bales and controls the rate of speed at which the bales are moved through the wrapper apparatus. When the forwardmost bale on the transporter bed 15 reaches the wrapper hoop 55, a projection (not shown) forming a part of the push gate 14 engages the actuator link 66 and pushes the actuator link rearwardly causing the slidable coupler 63 to move rearwardly and disengage from the hydraulic motor 72. Therefore, when the last bale on the transporter 10 is fed into the wrapper apparatus 50, the operative power for the wrapper apparatus 50 automatically ceases. The rearward movement of the actuator link 66 also unlatches the transporter bed 15 from the wrapper frame 51, whereupon a lowering of the rearwardmost end of the transporter bed 15 through manipulation of the hydraulic cylinders 37 affects disconnection of the transporter 10 from the wrapper apparatus 50.

The above-described operation of collecting bales from the field, backing into the wrapper apparatus 50, automatically connecting the hydraulic motor 72 on the transporter 10 to the drive mechanism 60 of the wrapper apparatus 50, and moving the bales into the wrapper hoop 55, then disconnecting and returning to the field is repeated until the desired number of bales have been wrapped. The primary difference with successive connections of the transporter 10 to the wrapper apparatus 50 is that all of the bales being wrapped are being pushed against wrapped bales on the ground G, which requires the application of the tractor brakes to manipulate the force applied to the bales passing through the wrapper hoop 55. With the transporter 10 being configured in a linear manner connecting in line to the tractor 10 and having the wrapper 50 also connected to the rearward end of the transporter 10 in line with the tractor T and the transporter 10, the entire operation of the transporter 10 and wrapper 50 can be conveniently accomplished as the entire implement is arranged in one line. Furthermore, the wrapper apparatus 50 has no axle and doesn't complicate maneuverability of the tractor T and transporter 10.

Once the desired number of bales has been wrapped, the operator reverses the transporter conveyor 17 to return the push gate 14 to the front of the transporter bed 15. A length of tube (not shown) is manually positioned between the push gate 14 and the end of the last wrapped bale within the wrapper hoop 55, and the stretch film is detached from that bale. The operator then drives the push plate 14 and the conveyor chains 17 rearwardly, pushing the wrapper apparatus 50 out from under the wrapped bales. The transporter bed 15 is then lowered, releasing the wrapper apparatus 50 from the transporter 10, whereupon, the wrapper apparatus 50 can be loaded onto the transporter 10 as described above.

One skilled in the art will recognize that a significant improvement of the instant application over the known prior art is that all power for operating the transporter 10 and the wrapper apparatus 50 comes directly from the tractor via mechanical connections. Specifically, the steering, braking and propulsion are supplied directly by the tractor (or other prime mover, such as a pick-up truck). The power to operate the wrapper apparatus 50 also comes directly from the tractor hydraulic system via a mechanical coupling between the hydraulic motor 72 carried by the transporter 10 and the mechanical drive apparatus 60. Furthermore, the hydraulic system 90 on the transporter 10 provides for an adjustable proportioning of the hydraulic fluid directed to the wrapper drive motor 72 and the transporter bed drive motor 45 to allow a selective variance of the number of wraps being placed on each bale fed from the transporter bed 15 to the wrapper apparatus 50.

The longitudinal alignment of the wrapper 50, transporter 10 and the tractor T providing power to the implements, enhances the ability to maneuver the transporter 10 and wrapper apparatus 50 to connect the wrapper 50 to the transporter 10 and to control the movement of large bales through the wrapping apparatus 50. Once a wrapped bale has been discharged from the wrapping apparatus 50, the continued operation of the combined transporter 10 and wrapping apparatus 50 is accomplished by allowing the tractor T to move forwardly with the transporter 10 and the wrapper apparatus 50 underneath the bales being wrapped. In practice, the tractor T is kept in neutral and the tractor T, transporter 10 and wrapper apparatus 50 are pushed forwardly against the bales on the ground such that the rate at which the bales are wrapped is synchronized with the forward movement of the tractor T, transporter 10 and wrapping apparatus 50. In essence, the bales remain substantially stationary while the implements are moved forwardly beneath the bales.

Referring now to FIGS. 38-42, an alternative pick-up mechanism 110 that is particularly adapted for engaging and elevating large rectangular bales R onto the transporter bed 15 can best be seen. The pick-up mechanism 110 is mounted on the frame 12 of the transporter 10 adjacent to the right hand rail 16 for loading large rectangular bales thereon. The mounting brackets 111 pivotally support a first lift frame 112 and a first hydraulic cylinder 113 operable to pivot the first lift frame 112 about the pivot axis carried by the mounting brackets 111. The distal end of the first lift frame 112 carries a second set of mounting brackets 114 for pivotally connecting an L-shaped second lift frame 115 having mounted at the distal end thereof a lift member 117. A second hydraulic cylinder 116 interconnects the first lift frame 112 and the second lift frame 115 to effect pivotal movement of the second lift frame 115 about the pivot axis carried by the second mounting brackets 114.

Preferably, the second and first hydraulic cylinders 116, 113 operate sequentially due to the geometry of the linkages and the relative areas of the hydraulic cylinders 116, 113 such that said first hydraulic cylinder 113 is not operable until the second hydraulic cylinder has completed its stroke in the operation of loading a bale unto the transporter bed 15. On the return of the pick-up mechanism 110 to the lowered position, the first hydraulic cylinder 113 contracts first before the second hydraulic cylinder 116 so that the first lift frame 112 is lowered before the second lift frame 115 is pivoted on the first lift frame 112.

Figure 41:
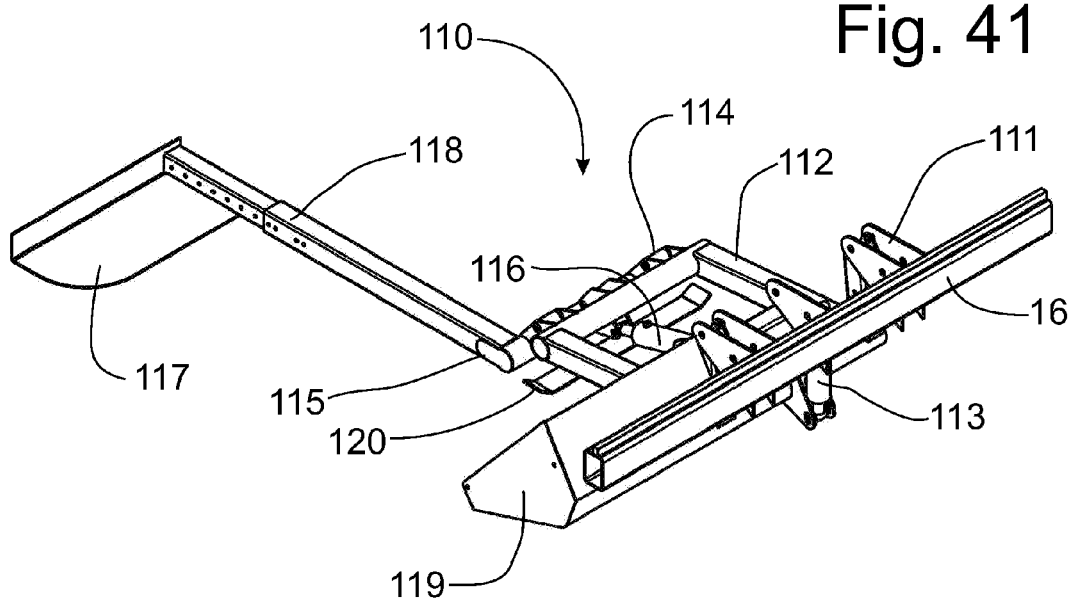
FIG. 41 is a perspective view of the alternative pick-up mechanism in the lowered bale engaging position.
Figure 42:
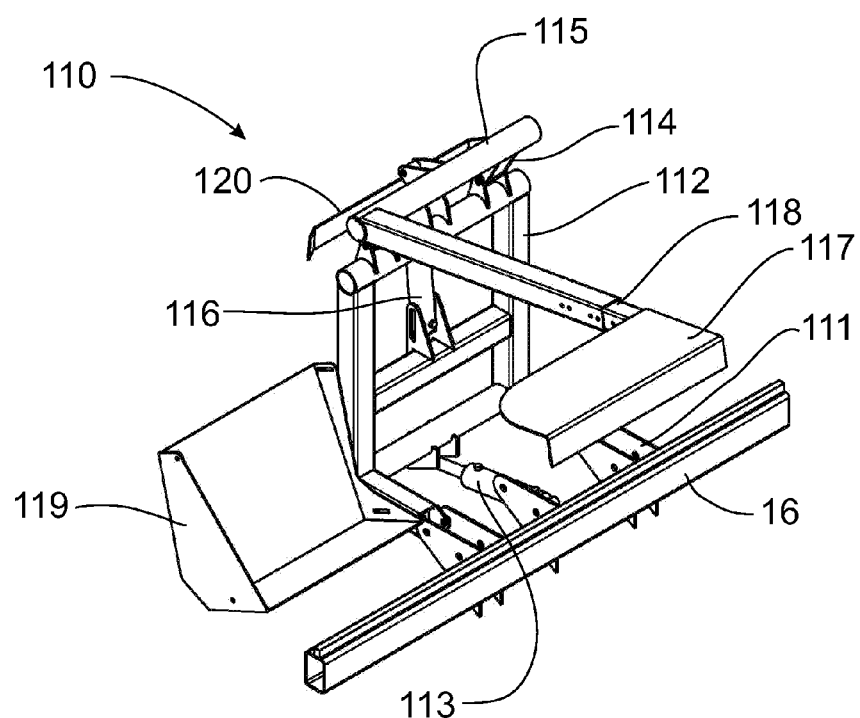
FIG. 42 is a perspective view of the alternative pick-up mechanism in the loading position.

An elevation pan 119 is secured to the first lift frame for movement therewith about the pivot axis carried by the first mounting brackets 111. The second lift frame 115 includes a transversely extending arm 118, the distal end of which has mounted thereon the lift member 117. The transversely extending arm 118 is preferably formed to be telescopic so as to laterally position the lift member 117 to conform to the size of rectangular bales R being engaged. A skid 115a is supported underneath the distal end of the first lift frame 112 to facilitate the movement of the pick-up mechanism 110 along the surface of the ground when the first and second lift frames 112, 115 are lowered into the initial position for engaging the large rectangular bales R, as depicted in FIGS. 39 and 41.

Figure 43:
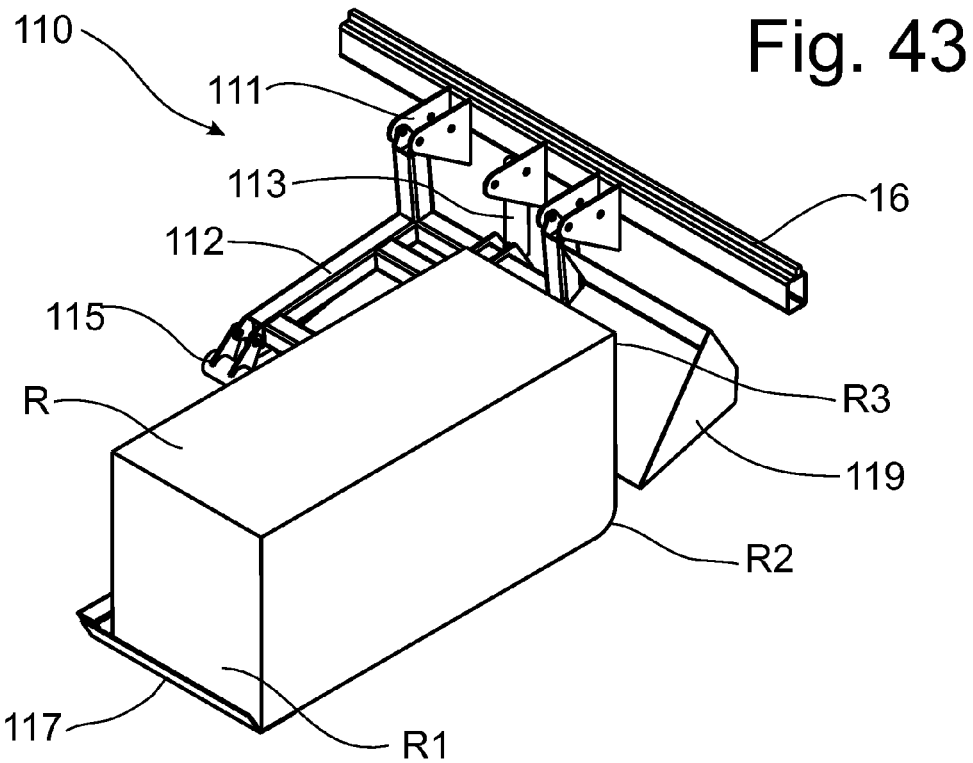
FIG. 43 is a perspective view of the pick-up mechanism corresponding to FIGS. 41 and 39 but showing a large rectangular bale being engaged.
Figure 44:
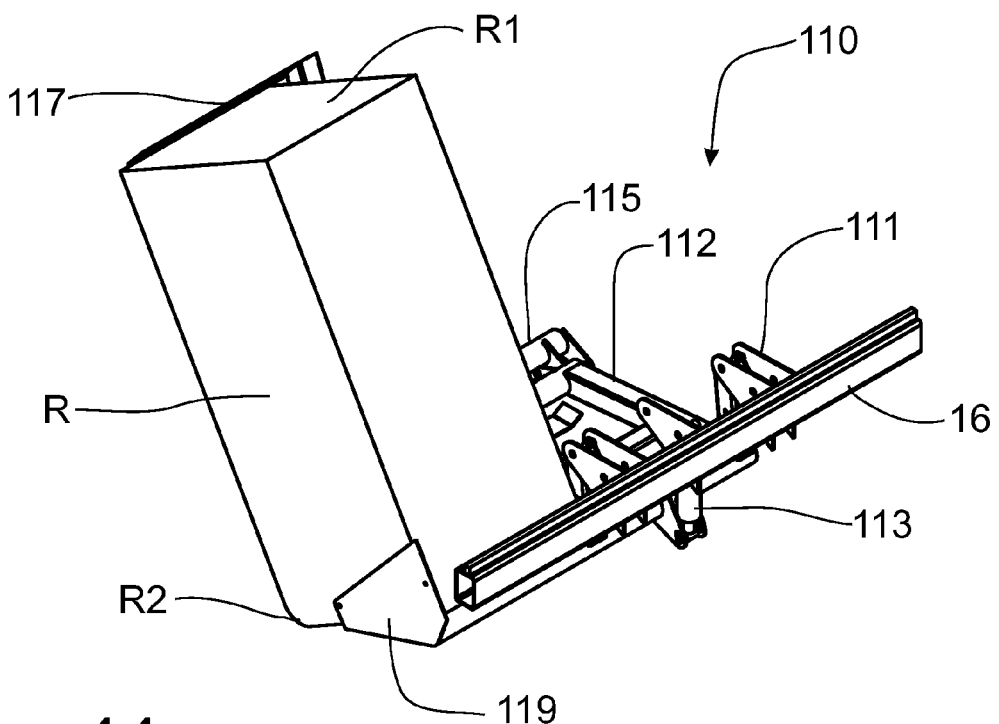
FIG. 44 is a perspective view of the pick-up mechanism with the large rectangular bale being in an elevated position.

The operation of the alternative bale pick-up mechanism 110 is shown in FIGS. 43-46. The transporter 10 is driven so that the pick-up mechanism 110 is positioned to engage the long side of a large rectangular bale R as is depicted in FIG. 43. One skilled in the art will recognize that the second lift frame 115 can be utilized to spin the bale into the proper orientation for loading onto the transporter bed 15. The lift member 117 at the distal end of the second lift frame 115 is slid under the far end R1 of the large rectangular bale R until the lift member 117 is located completely underneath the far end R1 of the large rectangular bale R. The operator then extends the second hydraulic cylinder 116 to pivot the second lift frame 115 relative to the first lift frame 112, and as a result lifting the far end R1 of the large rectangular bale R and tipping the large rectangular bale R about the lower near corner R2 of the large rectangular bale R, as is shown in FIG. 44. This tipping of the large rectangular bale R drops the upper near corner R3 into the elevation pan 119 as is depicted in FIG. 44.

Figure 45:
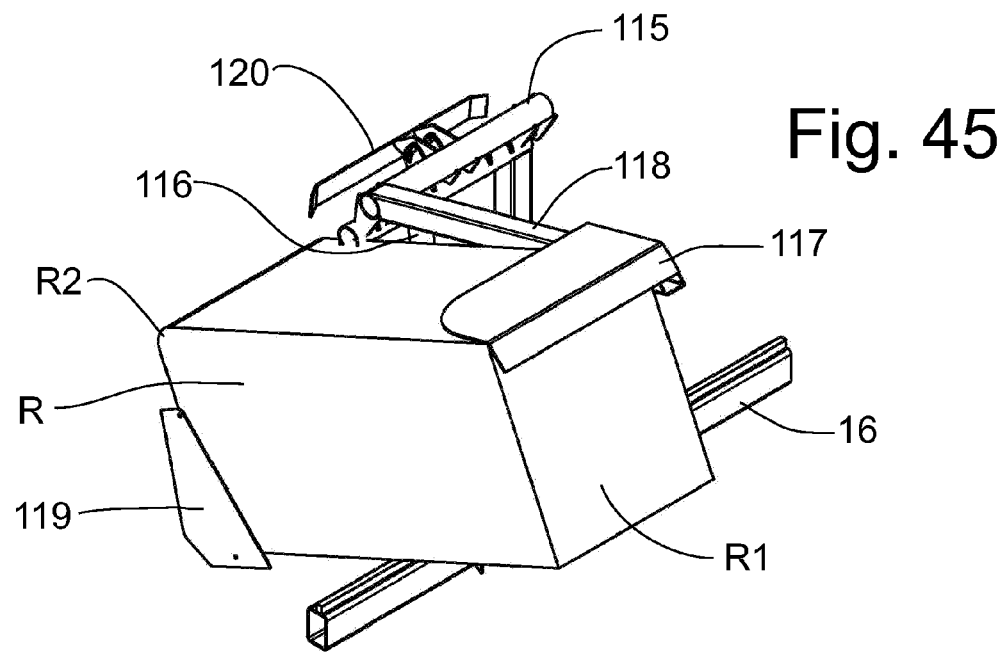
FIG. 45 is a perspective view of the pick-up mechanism with the large rectangular bale being raised into a loading position.
Figure 46:
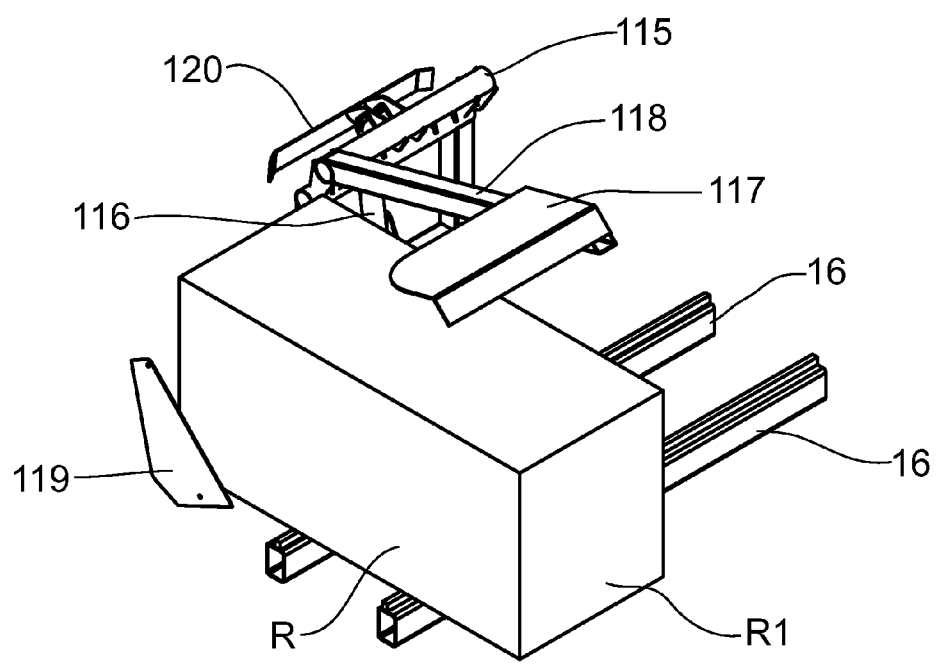
FIG. 46 is a perspective view of the pick-up mechanism with the large rectangular bale being loaded onto the transporter bed.

Once the second cylinder 116 is fully extended, the large rectangular bale R is standing substantially upright on the lower near corner R2 with the upper rear corner R3 received in the elevation pan 119. The operator can then extend the first hydraulic cylinder 113 to pivot the first lift frame 112 about the pivot axis carried by the first mounting brackets 111, which also moves the second lift frame 115 about the same pivot axis. The elevation pan 119 raises the large rectangular bale R with the first lift frame 112, as is shown in FIG. 45, until the large rectangular bale R is dropped onto the rails 16, as is depicted in FIG. 46. At this point, the large rectangular bale R is disengaged from the elevation pan 119 and the lift member 117, which frees the pick-up mechanism 110 to return to the initial loading position shown in FIG. 41 by retracting the first and second hydraulic cylinders 113 and 116. As is described above, the transporter bed 15 moves the loaded large rectangular bale R rearwardly along the transporter rails 16 to make room for the loading of the next large rectangular bale R.

It will be understood that changes in the details, materials, steps and arrangements of parts which have been described and illustrated to explain the nature of the invention will occur to and may be made by those skilled in the art upon a reading of this disclosure within the principles and scope of the invention. The foregoing description illustrates the preferred embodiments of the invention; however, concepts, as based upon the description, may be employed in other embodiments without departing from the scope of the invention.

For example, a GPS system can be utilized to help control the coupling of the transporter 10 to the wrapper apparatus 50, as well as track the location of the tractor T and attached transporter 10 relative to the wrapper apparatus 50. Automated control of the tractor T and transporter 10 may also be accomplished through the use of fa GPS system, including the backing of the transporter 10 into engagement with the wrapper apparatus 50. Furthermore, a video camera mounted on the end of the transporter 10 and an associated monitor at the tractor T where the operator is located can be used to facilitate the coupling of the transporter 10 to the wrapper apparatus 50 by providing a visual image of the apparatus while the operator is still seated in the tractor T.

Having thus described the invention, what is claimed is:

1. Apparatus for transporting and wrapping large bales comprising:
   a transporter including:
      a longitudinally extending transporter bed defining a forward end and a rearward end;
      a bale conveying mechanism associated with said transporter bed to move large bales loaded onto said transporter bed rearwardly;
      a pick-up apparatus mounted at said forward end to engage large bales on the surface of the ground and elevate said large bales onto said transporter bed;
      a drive mechanism powering the operation of said bale conveying mechanism and said pick-up apparatus; and
      a connector located at said rearward end; and
   a bale wrapper detachably connectable to said rearward end of said transporter in longitudinal alignment with said transporter bed and including:
      a bale wrapping apparatus operable to receive large bales from said rearward end of said transporter bed and to wrap plastic material around a periphery of said large bales;
      a driven mechanism to drive the operation of said bale wrapping apparatus; and
      a connection mechanism engagable with said connector on said transporter to detachably couple said bale wrapper to said rearward end of said transporter.

2. The apparatus of claim 1 wherein said bale wrapper further comprises a guide member projecting forwardly to be engaged by said rearward end of said transporter frame and facilitate alignment between said connector and said connection mechanism.

3. The apparatus of claim 1 wherein said connector is supported on a swivel mount carried by said rearward end of said transporter, said driven mechanism being automatically connected to said transporter drive mechanism when said connector engages said connection mechanism.

4. The apparatus of claim 3 wherein said drive mechanism includes a rotatable power source supported on said connector for movement about said swivel mount.

5. The apparatus of claim 4 wherein said connector comprises a formed connector plate movable about a swivel point defined by said swivel mount, said connection mechanism including a connection bracket having a downwardly opening slot shaped to receive said connector plate, said connector plate being engagable with said connection bracket by dropping below said slot and being raised into engagement therewith.

6. The apparatus of claim 5 wherein said connection bracket includes hook members forming said slot, said hook members being sized to be aligned with said swivel point when said connector plate is engaged within said slot.

7. The apparatus of claim 5 wherein said rotatable power source is a hydraulic motor mounted in alignment with said swivel point.

8. The apparatus of claim 4 wherein said transporter includes a slidable coupling mounted for movement with a pivoted actuator arm, said actuator arm being pivotable to retract the slidable coupling until said connector is engaged with said connection mechanism and in alignment with said rotatable power source, whereupon said actuator arm pivots said slidable coupling into engagement with said rotatable power source to receive operative power therefrom.

9. The apparatus of claim 8 wherein said connector includes a flange member engaged within a downwardly opening slot in said connection mechanism to connect said bale wrapper to said transporter, said actuator arm being positionable to trap said flange member within said connection mechanism when said slidable coupling is connected to said rotatable power source.

10. The apparatus of claim 1 further comprising an axle assembly being pivotable about an axis of rotation to lower said transporter bed to effect vertical movement of said rearward end of said transporter bed relative to said forward end.

11. The apparatus of claim 10 wherein said transporter bed includes a pair of longitudinally extending rails, said axle assembly comprises:
 a central transverse member supporting said rails;
 a pair of laterally spaced stub axles supporting respective ground engaging wheels and being connected respectively at an inner end to said central transverse member in an offset relationship, said stub axles being rotatable about a transverse axis of rotation;
 at least one hydraulic cylinder connected to said central transverse member to cause rotation of said central transverse member about said axis of rotation defined by said stub axles, the rotation of said central transverse member effecting a lowering of said central transverse member and the rails supported thereon.

12. The apparatus of claim 10 wherein said transporter is connected at said forward end to vertically movable lower lift links on a prime mover, said forward end being positionally fixed as said transporter bed is lowered by said axle assembly so that said rearward end can be positioned adjacent the ground.

13. The apparatus of claim 1 further comprising a push gate mounted on said forward end of said transporter and selectively movable between an inactive position mounted on said forward end and a operable position engaged with said bale conveying mechanism to push said large bales rearwardly along said transporter bed when said bale conveying mechanism is moved rearwardly.

14. The apparatus of claim 1 wherein said transporter drive mechanism includes a transverse drive shaft connected to said bale conveying mechanism at said rearward end of said transporter bed, said transverse drive shaft carrying a pair of laterally spaced rollers mounted for rotation with the bale conveying mechanisms to engage bales on the ground to retrieve said bales onto said rearward end of said transporter bed for transportation thereof.

15. The apparatus of claim 1 wherein said large bales are oriented on said transporter bed in a longitudinal orientation so that said bale conveying mechanism can transport said large bales longitudinally rearwardly relative to said transporter, said transporter and said bale wrapper being moved forwardly as said large bales are being moved rearwardly.

16. The apparatus of claim 15 wherein said transporter and said bale wrapper are moved forwardly at a rate of speed substantially equal to a rate of speed said large bales are moved rearwardly.

17. The apparatus of claim 16 wherein said transporter is connected at said forward end to a prime mover to provide operative and motive power for said transporter, said forward movement of said transporter and said bale wrapper being accomplished by said bale conveying mechanism pushing said large bales on said transporter bed against a stop.

18. The apparatus of claim 17 wherein said stop is formed by large bales previously wrapped by said bale wrapper and deposited on the ground behind the bale wrapper.

19. The apparatus of claim 18 wherein said forward movement of said transporter and said bale wrapper is resisted by braking said prime mover.

20. The apparatus of claim 1 wherein said drive mechanism is automatically connected to said driven mechanism when said bale wrapper is connected to said rearward end of said transporter, such that said drive mechanism of said transporter powers the operation of said bale wrapper through said driven mechanism.

21. The apparatus of claim 1 wherein said pick-up mechanism comprises:
 an inboard lift frame pivotally connected to said transporter for movement about a first pivot axis between a raised position and a lowered position;
 an outboard lift frame pivotally connected to said inboard lift frame for movement about a second pivot axis between an outward position and an inward position; and
 a lift mechanism interconnecting said transporter and said inboard lift frame to cause a sequential pivotal movement of said inboard lift frame after said outboard lift frame has been moved to said inward position.

22. The apparatus of claim 21 wherein said lift mechanism comprises:
 a first hydraulic cylinder interconnecting said transporter and said inboard lift frame to effect movement of said inboard lift frame about said first pivot axis; and
 a second hydraulic cylinder interconnecting said inboard lift frame and said outboard lift frame to effect movement of said outboard lift frame about said second pivot axis, said first and second hydraulic cylinders being operable sequentially with said second hydraulic cylinder moving said outboard lift frame from said outward position to said inward position before said first hydraulic cylinder moves said inboard lift frame from said lowered position to said raised position to load a large bale onto said transporter bed.

23. The apparatus of claim 21 wherein said lift mechanism comprises:
- a hydraulic cylinder interconnecting said transporter and said outboard lift frame to effect movement of said outboard lift frame between said outward position and said inward position, said inboard lift frame including a stop to restrict the pivotal movement of said outboard lift frame relative to said inboard lift frame when said inward position has been reached, a continued stroke of said hydraulic cylinder effecting the movement of said inboard lift frame to said raised position.

24. The apparatus of claim 21 wherein said outboard lift frame includes a lift member for controlling the movement of said large bale upwardly from said outward position.

25. The apparatus of claim 21 wherein said inboard lift frame includes an elevation member affixed thereto for controlling the orientation of said large bale as said pick-up mechanism raises said large bale onto said transporter bed.

\* \* \* \* \*